(12) United States Patent
Tachibana et al.

(10) Patent No.: US 9,594,003 B2
(45) Date of Patent: Mar. 14, 2017

(54) TIRE TESTING APPARATUS

(71) Applicant: MITSUBISHI HEAVY INDUSTRIES MACHINERY TECHNOLOGY CORPORATION, Hiroshima-shi, Hiroshima (JP)

(72) Inventors: Makoto Tachibana, Hiroshima (JP); Jiro Agawa, Hiroshima (JP); Morihiro Imamura, Hiroshima (JP); Tatsuya Ueda, Hiroshima (JP); Yoshinori Miyamoto, Hiroshima (JP)

(73) Assignee: MITSUBISHI HEAVY INDUSTRIES MACHINERY TECHNOLOGY CORPORATION, Hiroshima (JP)

( * ) Notice: Subject to any disclaimer, the term of this patent is extended or adjusted under 35 U.S.C. 154(b) by 466 days.

(21) Appl. No.: 14/346,237

(22) PCT Filed: Dec. 21, 2012

(86) PCT No.: PCT/JP2012/083261
§ 371 (c)(1),
(2) Date: Mar. 20, 2014

(87) PCT Pub. No.: WO2013/105418
PCT Pub. Date: Jul. 18, 2013

(65) Prior Publication Data
US 2014/0230534 A1 Aug. 21, 2014

(30) Foreign Application Priority Data
Jan. 12, 2012 (JP) ................................. 2012-004503

(51) Int. Cl.
*G01M 17/00* (2006.01)
*G01M 17/02* (2006.01)
(Continued)

(52) U.S. Cl.
CPC ........ *G01M 17/021* (2013.01); *G01M 17/027* (2013.01); *G01B 11/24* (2013.01);
(Continued)

(58) Field of Classification Search
CPC .......... G01M 1/02; G01M 1/326; G01M 1/16; G01M 1/225; G01M 17/027; G01B 11/24
(Continued)

(56) References Cited

U.S. PATENT DOCUMENTS 3,043,130 A * 7/1962 Patterson ................ G01M 3/04
248/221.12
4,124,337 A 11/1978 Martin
(Continued)

FOREIGN PATENT DOCUMENTS

CN 1510408 A 7/2004
CN 101144757 A 3/2008
(Continued)

OTHER PUBLICATIONS

International Search Report mailed Mar. 19, 2013, corresponds to International application No. PCT/JP2012/083261.
(Continued)

*Primary Examiner* — Lisa Caputo
*Assistant Examiner* — Jonathan Dunlap
(74) *Attorney, Agent, or Firm* — Kanesaka Berner and Partners LLP

(57) ABSTRACT

A tire testing apparatus includes: a lower rim that is formed with a lower through hole, and a rim-side inclined surface that increases in diameter in a downward direction of an inner peripheral surface of a lower end portion of the lower through hole; an upper rim that is held to face the lower rim; an insertion part capable of being inserted through the lower through hole; and an apparatus-side inclined surface that is provided at a lower end portion of the insertion part,
(Continued)

increases in diameter from an outer peripheral surface of the insertion part in the downward direction, and is capable of coming into contact with the rim-side inclined surface.

20 Claims, 28 Drawing Sheets

(51) Int. Cl.
  *G01M 1/02* (2006.01)
  *G01B 11/24* (2006.01)
  *G01M 1/32* (2006.01)
  *G01M 1/22* (2006.01)
  *G01M 1/16* (2006.01)

(52) U.S. Cl.
  CPC ............... *G01M 1/02* (2013.01); *G01M 1/16* (2013.01); *G01M 1/225* (2013.01); *G01M 1/326* (2013.01)

(58) Field of Classification Search
  USPC .............................. 73/460, 146, 462; 33/203
  See application file for complete search history.

(56) References Cited

U.S. PATENT DOCUMENTS

| | | | |
|---|---|---|---|
| 4,763,710 A | 8/1988 | Pielach | |
| 4,971,128 A * | 11/1990 | Koga | G01M 17/021 127/21 |
| 5,107,702 A * | 4/1992 | Iwama | G01M 17/021 73/146 |
| 5,107,703 A * | 4/1992 | Ota | B29D 30/0061 73/146 |
| 6,131,455 A * | 10/2000 | Matsumoto | G01M 1/045 73/146 |
| 6,237,402 B1 | 5/2001 | Reese | |
| 6,658,936 B2 * | 12/2003 | Matsumoto | G01M 1/045 73/460 |
| 7,320,352 B2 * | 1/2008 | Hirata | B60B 21/04 157/1.35 |
| 7,340,947 B2 * | 3/2008 | Shinomoto | G01M 1/045 73/146 |
| 7,357,170 B2 * | 4/2008 | Hirata | B60B 25/00 157/1.35 |
| 8,464,579 B2 * | 6/2013 | Nakayama | G01M 17/021 73/146 |
| 2001/0032499 A1 | 10/2001 | Jenniges et al. | |
| 2002/0124650 A1 * | 9/2002 | Matsumoto | G01M 1/045 73/460 |
| 2006/0107735 A1 * | 5/2006 | Merlo | G01M 1/045 73/146 |
| 2007/0220964 A1 * | 9/2007 | Shinomoto | G01M 17/021 73/146 |
| 2011/0226050 A1 * | 9/2011 | Nakayama | G01M 17/021 73/146 |
| 2013/0233066 A1 * | 9/2013 | Wakazono | G01M 17/021 73/146 |
| 2013/0233067 A1 * | 9/2013 | Wollbrinck | G01M 17/021 73/146 |
| 2014/0007679 A1 * | 1/2014 | Kanei | G01M 1/06 73/460 |
| 2014/0060181 A1 * | 3/2014 | Tachibana | B60C 19/00 73/460 |
| 2014/0069180 A1 * | 3/2014 | Ueda | B60C 25/002 73/146 |
| 2014/0230534 A1 * | 8/2014 | Tachibana | G01M 17/021 73/146 |
| 2014/0311246 A1 * | 10/2014 | Oda | G01B 17/02 73/627 |
| 2014/0352419 A1 * | 12/2014 | Fujishima | B60C 19/00 73/146 |

FOREIGN PATENT DOCUMENTS

| | | |
|---|---|---|
| DE | 19738335 A1 | 3/1998 |
| DE | 69828384 T2 | 12/2005 |
| JP | 62-148832 A | 7/1987 |
| JP | 62135937 U | 8/1987 |
| JP | 63232009 A | 9/1988 |
| JP | 2171633 A | 7/1990 |
| JP | 347742 A | 2/1991 |
| JP | 3110138 A | 5/1991 |
| JP | 3231834 A | 10/1991 |
| JP | 4310838 A | 11/1992 |
| JP | 5281075 A | 10/1993 |
| JP | 9-126956 A | 5/1997 |
| JP | 2661753 B2 | 10/1997 |
| JP | 3040514 B2 | 5/2000 |
| JP | 3672135 B2 | 7/2005 |
| JP | 2011174839 A | 9/2011 |
| JP | 2013-104744 A | 5/2013 |
| TW | 381173 B | 2/2000 |

OTHER PUBLICATIONS

Written Opinion mailed Mar. 19, 2013, corresponds to International application No. PCT/JP2012/083261.

Office Action mailed Mar. 13, 2015, corresponding to German patent application No. 112012004213.1.

Office Action mailed Apr. 21, 2015, corresponding to Japanese patent application No. 2012-004503.

Office Action mailed Sep. 15, 2015, corresponding to Taiwanese Patent Application No. 101149333, for which an explanation of relevance is attached.

Office Action mailed Sep. 17, 2015, corresponding to Chinese Patent Application No. 201280047895.3 for which an explanation of relevance is attached.

Office Action in KR Application No: 10-2014-7007815, mailed Jan. 22, 2016.

* cited by examiner

TIRE TESTING APPARATUS

RELATED APPLICATIONS

This application is a National Phase of International Application Number PCT/JP2012/083261, filed Dec. 21, 2012, and claims priority from Japan Application Number 2012-004503, filed Jan. 12, 2012.

TECHNICAL FIELD

The present invention relates to a tire testing apparatus for attaching a tire to perform testing.

Priority is claimed on Japanese Patent Application No. 2012-004503, filed Jan. 12, 2012, the content of which is incorporated herein by reference.

BACKGROUND ART

As tire testing apparatuses, there are a tire uniformity measuring apparatus that measures the uniformity of a tire, and a tire balance measuring apparatus that measures the balance of a tire. In measurement using the tire testing apparatuses, a rim assembly to which a test tire is fixed has to be replaced for different tire based on bead diameter or bead breadth.

For example, in a tire testing apparatus disclosed in Patent Document 1, a cylindrical lower rim holder integrated with a lower rim is attached to a supporting member. A portion of an external surface of the supporting member forms an apparatus-side inclined surface that increases in diameter in a downward direction. On the other hand, since an external surface of the lower rim holder is also provided with a rim-side inclined surface that increases in diameter in the downward direction, the lower rim holder is supported by the supporting member by arranging the rim-side inclined surface on the apparatus-side inclined surface. By forming the apparatus-side inclined surface and the rim-side inclined surface, respectively, so as to increase in diameter in the downward direction, the apparatus-side inclined surface and the rim-side inclined surface can be brought into surface contact with each other, and the lower rim holder can be positioned on an axis of the apparatus-side inclined surface to stably support the lower rim holder.

An upper rim is arranged above the lower rim so as to face the lower rim. By moving the upper rim up and down by an air cylinder connected to the upper rim, the interval between the upper and lower rims can be adjusted based on the diameter or breadth of a tire.

RELATED ART DOCUMENT

Patent Document

[Patent Document 1] Japanese Unexamined Patent Application, First Publication No. H5-281075

SUMMARY OF THE INVENTION

Problem to be Solved by the Invention

However, there is a concern that the lower rim holder may positionally deviate with respect to the supporting member depending on whether processing accuracy of the apparatus-side inclined surface or dimension variations in a plurality of the lower rim holders. If the lower rim holder deviates positionally, arrangement of the tire attached to the upper rim and the lower rim is not constant, and uniformity or balance of the tire cannot be accurately measured.

An object of the invention is to provide a tire testing apparatus that keeps a lower rim from positionally deviating with respect to an apparatus-side inclined surface.

Means for Solving the Problem

A first aspect of the tire testing apparatus of the present invention includes: a lower rim that is formed with a lower through hole, and a rim-side inclined surface that increases in diameter in a downward direction of an inner peripheral surface of a lower end portion of the lower through hole; an upper rim that is held to face the lower rim; an insertion part capable of being inserted through the lower through hole; and an apparatus-side inclined surface that is provided at a lower end portion of the insertion part, increases in diameter from an outer peripheral surface of the insertion part in the downward direction, and is capable of coming into contact with the rim-side inclined surface. The tire testing apparatus is configured to attach the tire between the lower rim and the upper rim to perform testing of the tire.

According to the present invention, the lower rim and the upper rim, which have a tire attached thereto and are held in a mutually facing state, are supported by inserting the insertion part through the lower through hole of the lower rim and causing the apparatus-side inclined surface to abut against the rim-side inclined surface. At this time, since the insertion part is inserted into the lower through hole, the inner peripheral surface of the lower through hole contacts the insertion part when the lower rim tilts with respect to the apparatus-side inclined surface, so that the lower rim can be kept from tilting and positionally deviating with respect to the apparatus-side inclined surface.

A second aspect of the tire testing apparatus of the present invention is that, in the first aspect, a pneumatic supply part configured to supply gas to between the lower rim and the upper rim when the rim-side inclined surface abuts against the apparatus-side inclined surface is further included.

According to the present invention, if gas is supplied to between the lower rim and the upper rim by the pneumatic supply part when a tire is attached between the lower rim and the upper rim, a force to set the upper rim and the lower rim apart from each other with the pressure of the gas is exerted, and the rim-side inclined surface is pressed against the apparatus-side inclined surface. For this reason, a frictional force between the apparatus-side inclined surface and the rim-side inclined surface is increased, and the lower rim can be reliably supported on the apparatus-side inclined surface.

A third aspect of the tire testing apparatus of the present invention is that, in the second aspect, a hole portion that opens so as to be capable of discharging the gas supplied from the pneumatic supply part is formed at a position of the outer peripheral surface of the insertion part that faces the inner peripheral surface of the lower through hole when the rim-side inclined surface abuts against the apparatus-side inclined surface.

According to the present invention, gas is supplied to the hole portion by the pneumatic supply part and the gas is discharged, in a state where the insertion part is inserted into the lower through hole and the inner peripheral surface of the lower through hole is made to face the hole portion. Since the discharged gas flows between the insertion part and the inner peripheral surface of the lower through hole, dust or the like adhering to the outer peripheral surface of the insertion part can be blown away and removed with the gas.

A fourth aspect of the tire testing apparatus of the present invention is that, in the third aspect, an elastic member that comes into sliding contact with the outer peripheral surface of the insertion part is provided at a position of the inner peripheral surfaces of the lower through hole that is further apart from the rim-side inclined surface than the hole portion when the rim-side inclined surface abuts against the apparatus-side inclined surface.

According to the present invention, the gas discharged from the hole portion flows toward the apparatus-side inclined surface by arranging the elastic member at the position further apart from the rim-side inclined surface than the hole portion. Accordingly, dust adhering to the outer peripheral surface of the insertion part or the like can be effectively removed, foreign matter can be prevented from entering this clearance during tire measurement.

A fifth aspect of the tire testing apparatus of the present invention is that, in any one of the first to fourth aspects, a small clearance is formed between the insertion part and the lower through hole when the rim-side inclined surface abuts against the apparatus-side inclined surface.

According to the present invention, the lower rim can be prevented from tilting with respect to the apparatus-side inclined surface with high precision.

A sixth aspect of the tire testing apparatus of the present invention is that, in any one of the first to fifth aspects, the upper rim is formed with an upper through hole that is capable of communicating with the lower through hole and through which the insertion part is capable of being inserted when the lower rim and the upper rim are made to face each other, and a small clearance is formed between the insertion part and the upper through hole when the rim-side inclined surface abuts against the apparatus-side inclined surface.

According to the present invention, the upper rim can be directly positioned by the insertion part, and the lower rim and the upper rim can be prevented from positionally deviating, respectively. Additionally, the upper rim can be prevented from tilting with respect to the apparatus-side inclined surface with high precision.

A seventh aspect of the tire testing apparatus of the present invention is that, the tire testing apparatus according to any one of the first to sixth aspects further includes a connecting part that is detachably attached to the upper rim; a clamping part that is configured to regulate movement of the connecting part in a direction of an axis of the connecting part; and a positioning part that positions the connecting part regulated in movement by the clamping part in a direction orthogonal to the axis.

According to the present invention, since the connecting part is engaged by the clamping part so as to keep a relative center, the connecting part is aligned. Moreover, as the connecting part is biased in the direction of the axis by the positioning part, the connecting part can be more reliably positioned in a direction orthogonal to the direction of the axis.

An eighth aspect of the tire testing apparatus of the present invention is that, the tire testing apparatus according to any one of the first to seventh aspects further includes a supporting part that rotatably supports the apparatus-side inclined surface around the axis of the insertion part; and a fixing mechanism that is provided at the supporting part and that is capable of switching a fixing state where the lower rim is fixed onto the apparatus-side inclined surface and a release state where the fixing state is released, when the rim-side inclined surface abuts against the apparatus-side inclined surface.

According to the present invention, when the apparatus-side inclined surface is in the state of being stopped with respect to the supporting part, the lower rim can be prevented from moving when a tire is detached by fixing the lower rim onto the apparatus-side inclined surface with the fixing mechanism and moving the upper rim so as to be set apart from the lower rim.

Additionally, since the fixing mechanism is provided at the supporting part, compared to a case where the fixing mechanism is provided so as to be connected to the apparatus-side inclined surface and is rotated, it is unnecessary to rotate the fixing mechanism and the fixing mechanism can be simply configured.

EFFECT OF THE INVENTION

According to the tire testing apparatus of the present invention, the lower rim can be kept from positionally deviating with respect to the apparatus-side inclined surface.

DESCRIPTION OF EMBODIMENTS

An embodiment of a tire testing apparatus according to the present invention will be described below referring to FIGS. 1 to 29.

In the following embodiment, a case where the tire testing apparatus is a tire uniformity measuring apparatus (hereinafter referred to as a "tire measuring apparatus") will be described.

Figure 1:
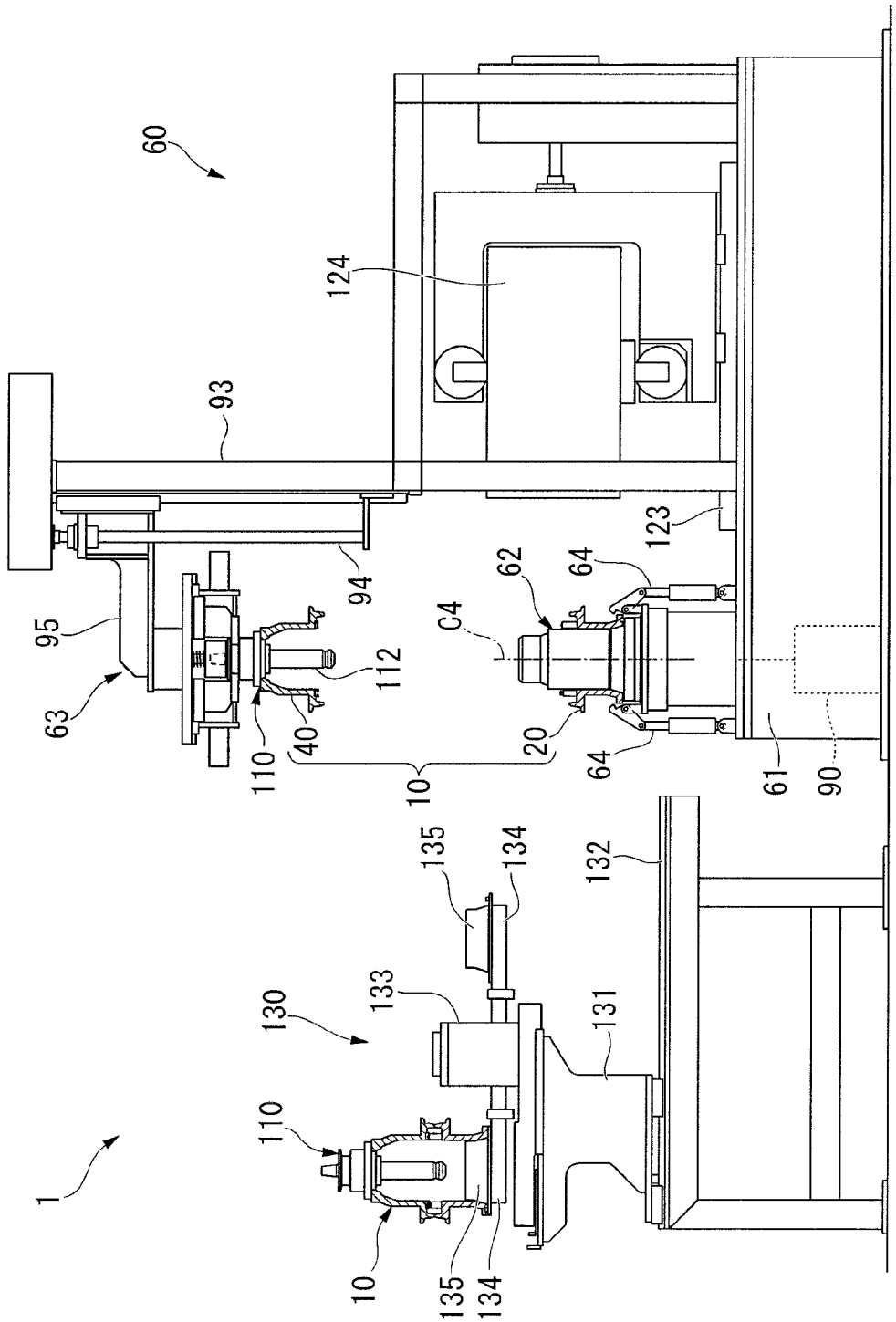
FIG. 1 is an explanatory view of a tire uniformity measuring apparatus of an embodiment of the present invention.

As shown in FIG. 1, the tire measuring apparatus 1 of the present embodiment includes a rim assembly 10 to which a tire that is a test object is attached, a body unit 60 that enables the rim assembly 10 to be attached thereto and detached therefrom and rotates the mounted rim assembly 10 around an axis thereof to perform measurement, and a rim replacement unit 130 for replacing the rim assembly 10 mounted on the body unit 60.

The tire measuring apparatus 1 includes various types of rim assemblies 10 with different external diameters based on the types of tires to be measured. In the following, one type of rim assembly 10 among them will be described.

Figure 2:
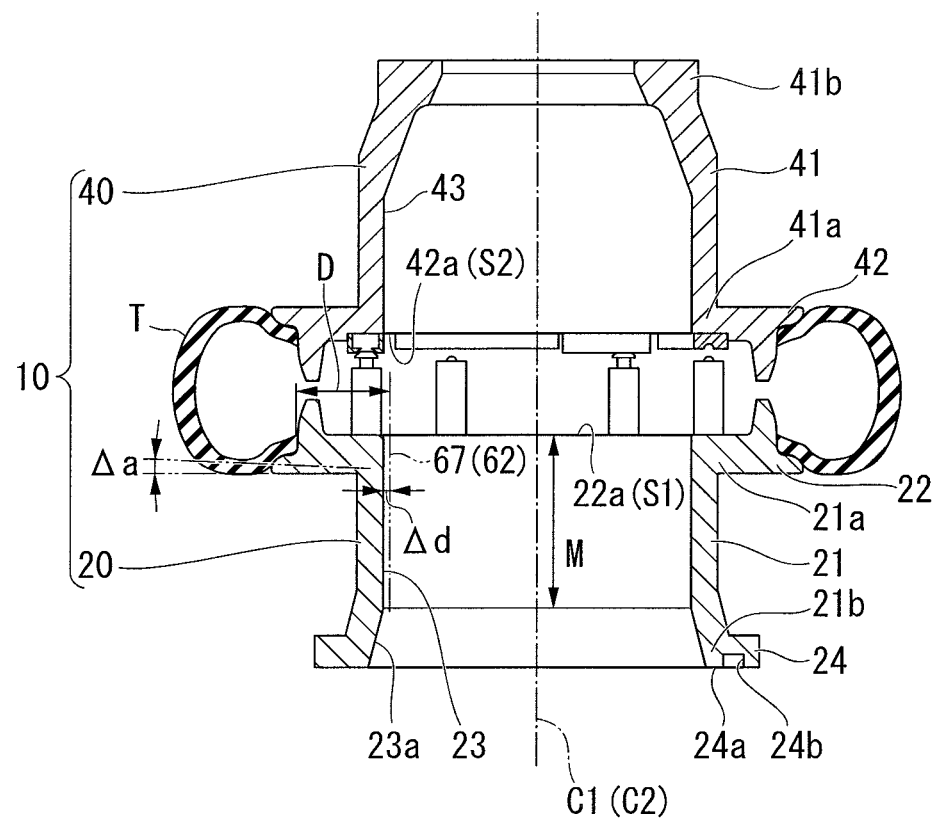
FIG. 2 is a cross-sectional view describing the state of a rim assembly attached to a lower spindle of the tire uniformity measuring apparatus.

FIG. 2 is a cross-sectional view describing the state of the rim assembly 10 attached to a lower spindle 62 of the body unit 60 to be described below. The lower spindle 62 is not shown in FIG. 2 for convenience of description.

The rim assembly 10 has a lower rim 20 and an upper rim 40. Both of the rims 20 and 40 can be engaged with each other or disengaged from each other in a state where a first reference surface S1 set at the lower rim 20 and a second reference surface S2 set at the upper rim 40 face each other.

The lower rim 20 has a body 21 that is formed in a substantially cylindrical shape, and a collar portion 22 that is provided at an outer peripheral surface of an upper end portion 21a of the body 21. The first reference surface S1 is formed on a principal surface 22a of the collar portion 22 opposite to a lower end portion 21b of the body 21.

The body 21 is formed with a lower through hole 23 that extends so as to be orthogonal to the first reference surface S1. An inner peripheral surface of the lower through hole 23 at the end portion 21b is formed with a rim-side inclined surface 23a that increases in diameter as being set apart from the upper end portion 21a. The rim-side inclined surface 23a is formed in the shape of a side surface of a truncated cone.

An outer peripheral surface of the lower end portion 21b of the body 21 is provided with a second collar portion 24. A principal surface 24a of the second collar portion 24 opposite to the collar portion 22 is formed with a positioning hole portion 24b.

Figure 3:
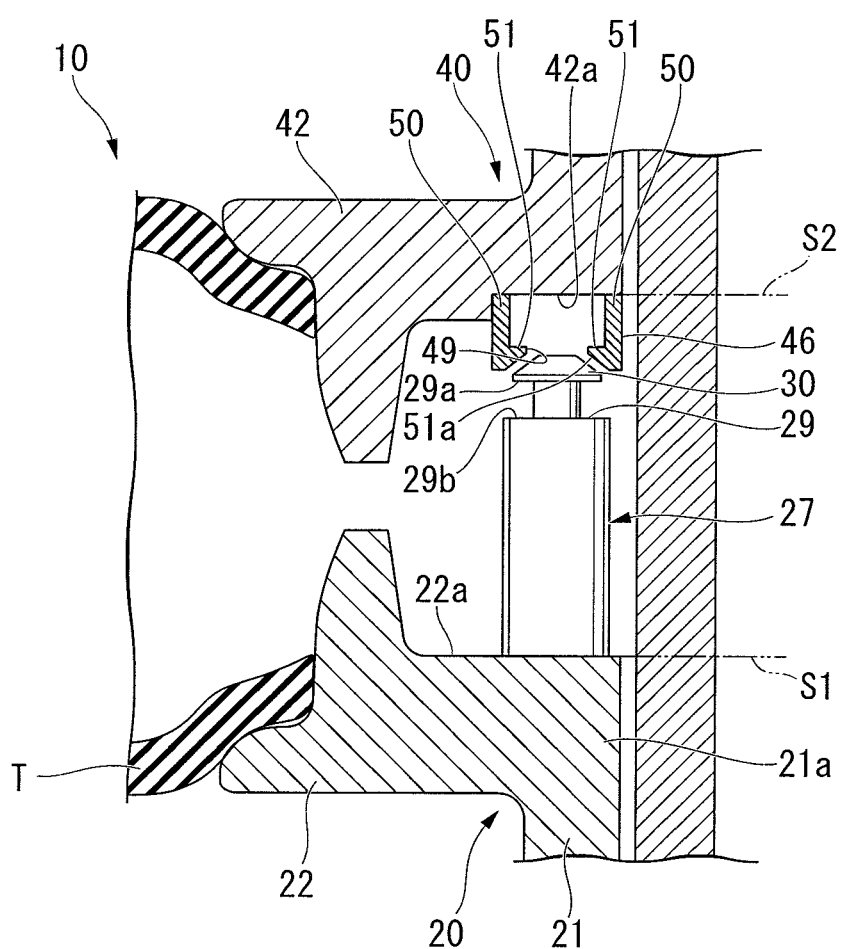
FIG. 3 is an enlarged view of main portions on a pin side of the rim assembly in FIG. 2.
Figure 4:
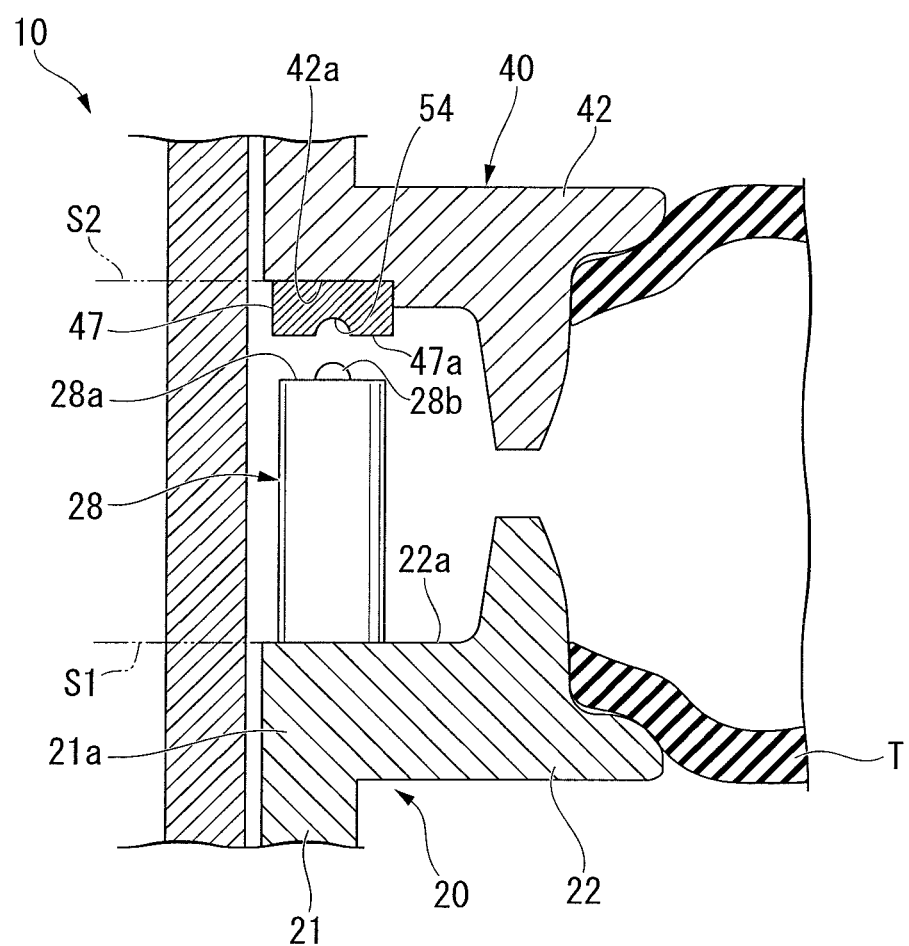
FIG. 4 is an enlarged view of main portions on a stand side of the rim assembly in FIG. 2.
Figure 5:
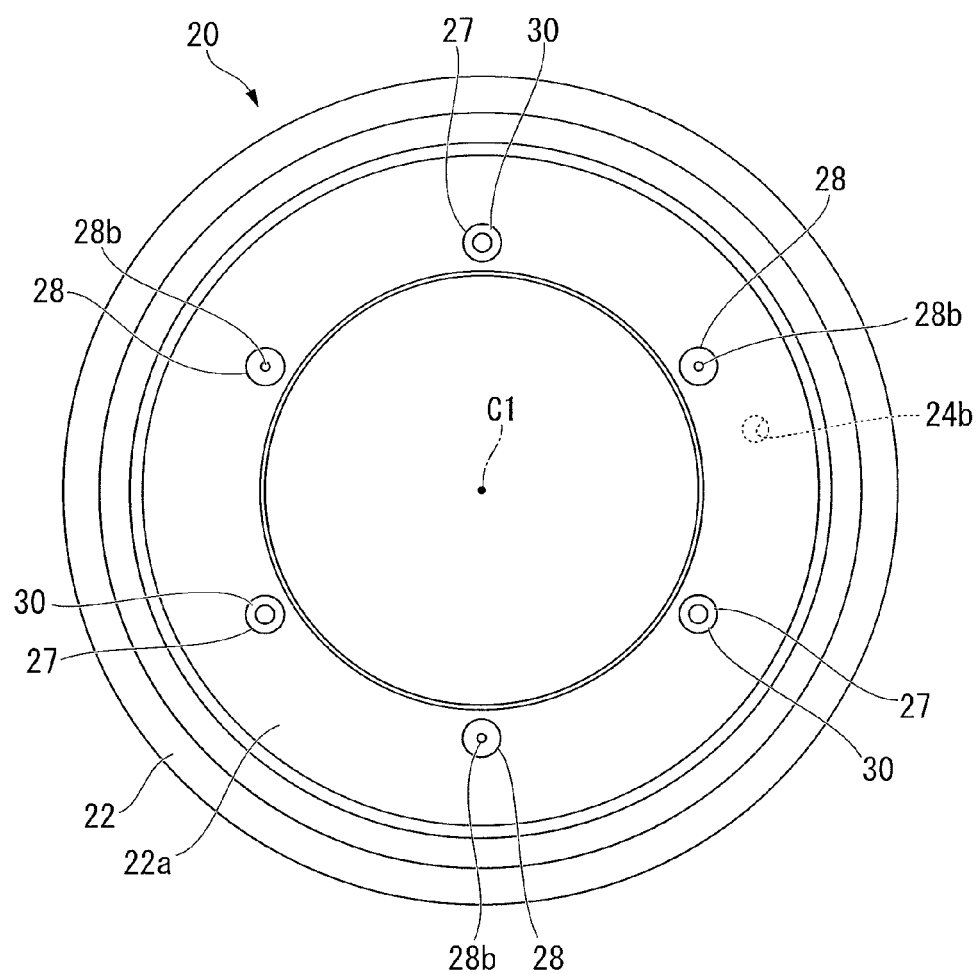
FIG. 5 is a plan view of a lower rim of the tire uniformity measuring apparatus.

As shown in FIGS. 3 to 5, pins 27 and stands 28 are erected from the principal surface 22a of the collar portion 22. Three pins 27 and three stands 28 are alternately arranged at equal angles around an axis C1.

Each pin 27, as shown in FIGS. 3 and 5, is formed in a substantially columnar shape, and a groove portion 29 is formed over the entire circumference of an outer peripheral surface of the pin 27 on a tip (upper side) in an erection direction. A side surface 29a that is provided with the tip of the groove portion 29 and a side surface 29b of the groove portion on a base end side are respectively formed so as to be parallel to the principal surface 22a. The portion of the pin 27 closer to the tip than the groove portion 29 is formed as a tapered projection portion 30 whose diameter decreases as being brought close to the tip.

As shown in FIGS. 4 and 5, each stand 28 is formed in a columnar shape. A tip surface 28a of the stand 28 is provided with a substantially semispherical convex portion 28b that protrudes from the tip surface 28a.

A tire T that is a test object is attached to a portion closer to an edge portion than a portion where the pins 27 and the stands 28 are provided, in the principal surface 22a of the collar portion 22.

As shown in FIG. 2, the upper rim 40 has a body 41 formed in a substantially cylindrical shape, and a collar portion 42 provided at an outer peripheral surface of a lower end portion 41a of the body 41. The second reference surface S2 is formed on a principal surface 42a of the collar portion 22 opposite to an upper end portion 41b of the body 41.

The body 41 is formed with an upper through hole 43 that extends so as to be orthogonal to the second reference surface S2.

Figure 6:
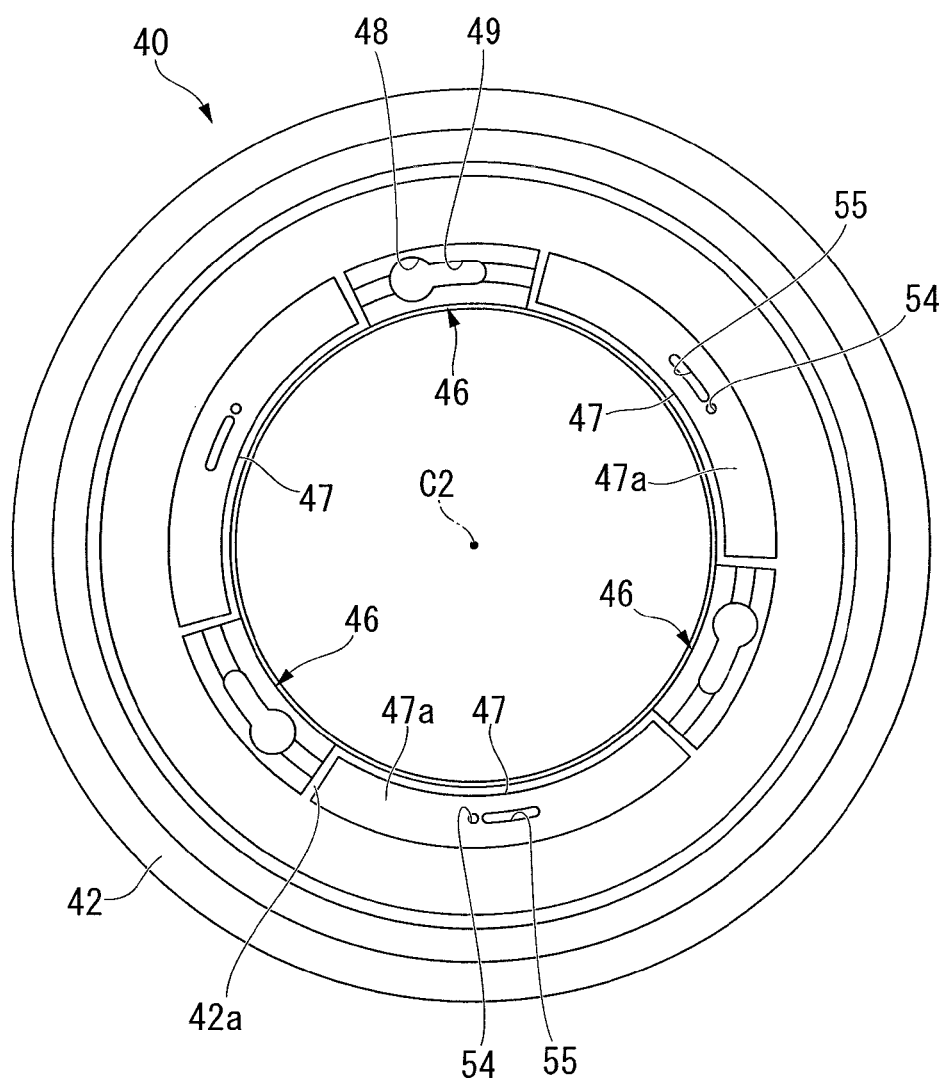
FIG. 6 is a bottom plan view of an upper rim of the tire uniformity measuring apparatus.

As shown in FIGS. 3, 4, and 6, the principal surface 42a of the collar portion 42 is provided with pin receiving portions 46 and stand receiving portions 47. Three pin receiving portions 46 and three stand receiving portions 47 are alternately arranged at equal angles around an axis C2 of the upper rim 40.

Figure 7:
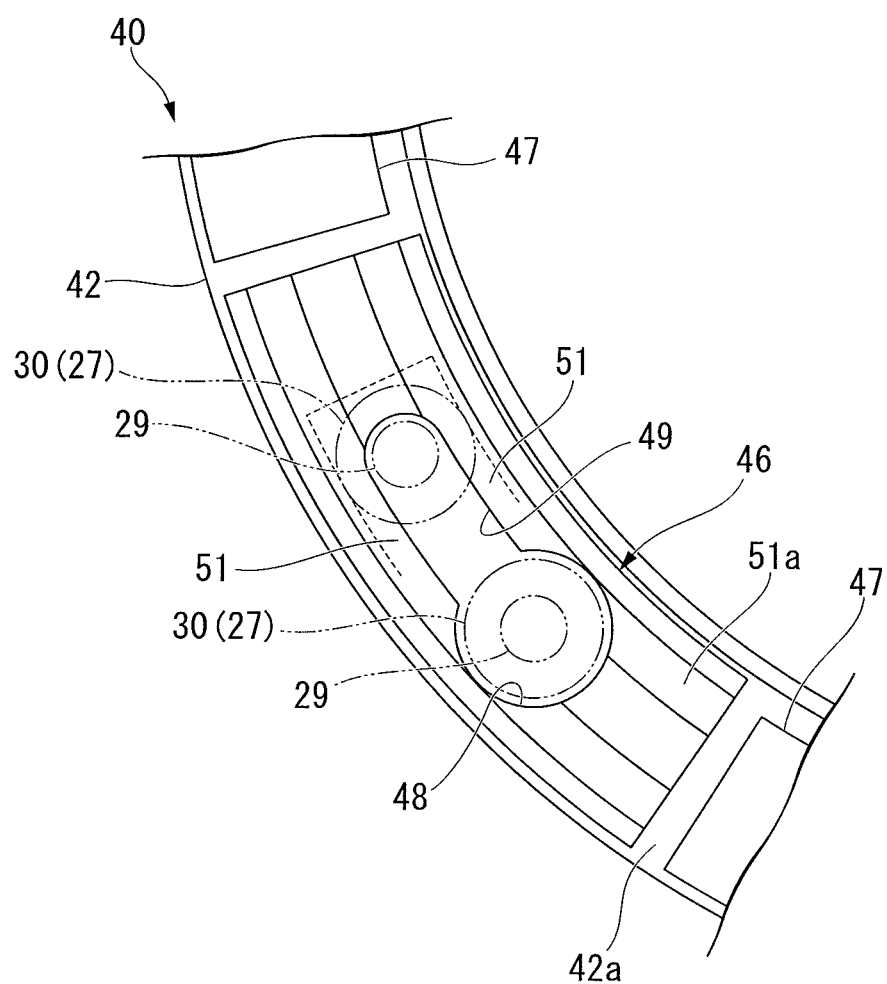
FIG. 7 is a bottom plan view for describing the engagement state between pins and pin receiving portions of the tire uniformity measuring apparatus.

As shown in FIGS. 3 and 7, each pin receiving portion 46 is formed with an inserting opening portion 48 and a sliding opening portion 49. The inserting opening portion 48 and the sliding opening portion 49 communicate with each other. The projection portion 30 of the pin 27 can be removably inserted into the inserting opening portion 48. The sliding opening portion 49 is formed in a portion of the inserting opening portion 48, and opens along the circumferential direction of the upper rim 40. The width of the sliding opening portion 49 is smaller than the external diameter of the projection portion 30 of the pin 27 and greater than the external diameter of the groove portion 29.

Figure 8:
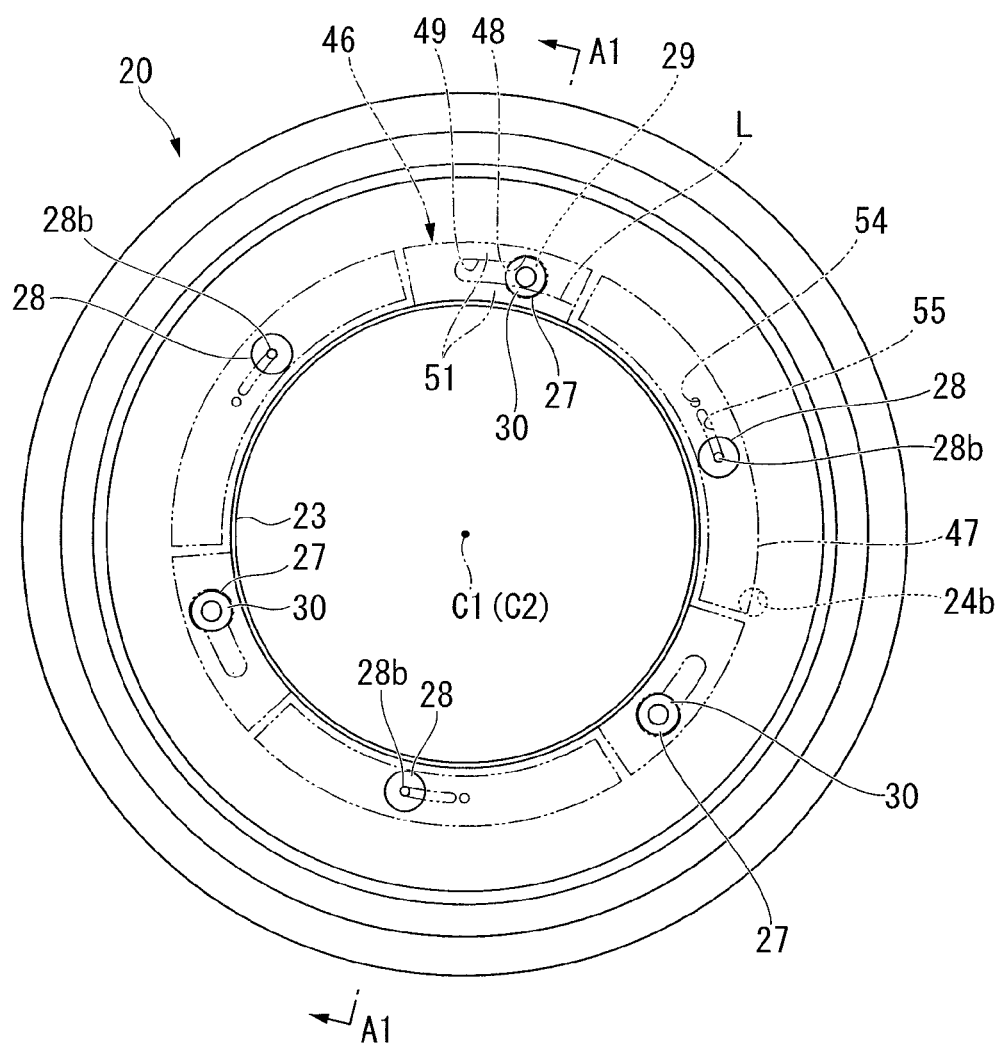
FIG. 8 is a plan view for describing a state where the pins of the lower rim are arranged within pin insertion parts of the pin receiving portions.

In a plan view shown in FIG. 8, the sliding opening portion 49 is arranged in the counterclockwise direction with respect to the inserting opening portion 48.

As shown in FIGS. 3 and 7, the pin receiving portion 46 has a pair of wall portions 50 that are erected from the principal surface 42a so as to face each other, and a pair of protruding portions 51 that are provided so as to extend from tip portions of the respective wall portions 50 toward the tip portions of the wall portions 50 that face each other. The aforementioned sliding opening portion 49 is formed by a clearance between the pair of protruding portions 51 that extend so as to be brought close to each other.

The respective wall portions 50 extend along the circumferential direction of the upper rim 40. The spacing between the wall portions 50 is wider than the external diameter of the projection portion 30 of the pin 27. The distance from the principal surface 42a to the protruding portions 51 is longer than the length of the projection portion 30.

The thickness dimension of the protruding portions 51 is set so as to become shorter than the distance between the side surfaces 29a and 29b of the groove portion 29. The protruding portions 51 are formed so as to be capable of being set apart from any of the side surfaces 29a and 29b when the protruding portions 51 are arranged within the groove portion 29.

The surfaces of the protruding portions 51 opposite to the principal surface 42a are formed with a concave groove 51a that can accommodate the projection portion 30 of the pin 27 and is formed in a concave shape.

As shown in FIG. 6, in a bottom view, each stand receiving portion 47 is formed in a circular-arc shape along the circumferential direction of the upper rim 40. In other words, the stand receiving portion 47 is formed so as to extend around the axis C2.

As shown in FIG. 4, a tip surface 47a of the stand receiving portion 47 is formed so as to become parallel to the principal surface 42a.

As shown in FIGS. 4 and 6, each tip surface 47a is formed with a concave portion 54. When the tip surface 28a of the stand 28 abuts against the tip surface 47a of the stand receiving portion 47, the concave portion 54 is enabled to engage the convex portion 28b of the stand 28.

Figure 10:
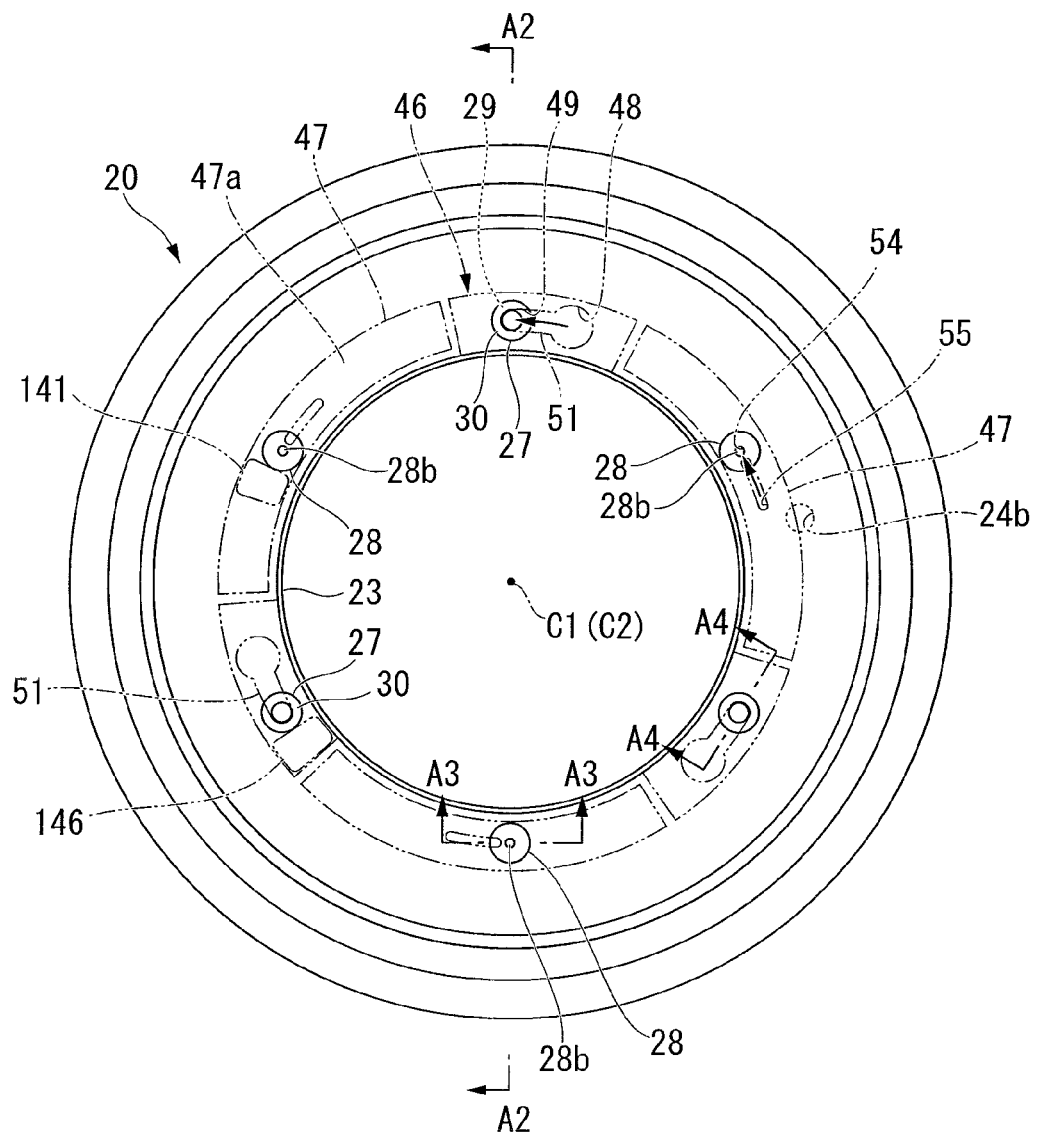
FIG. 10 is a plan view for describing a state where protruding portions are arranged within groove portions of the pins of the lower rim.
Figure 11:
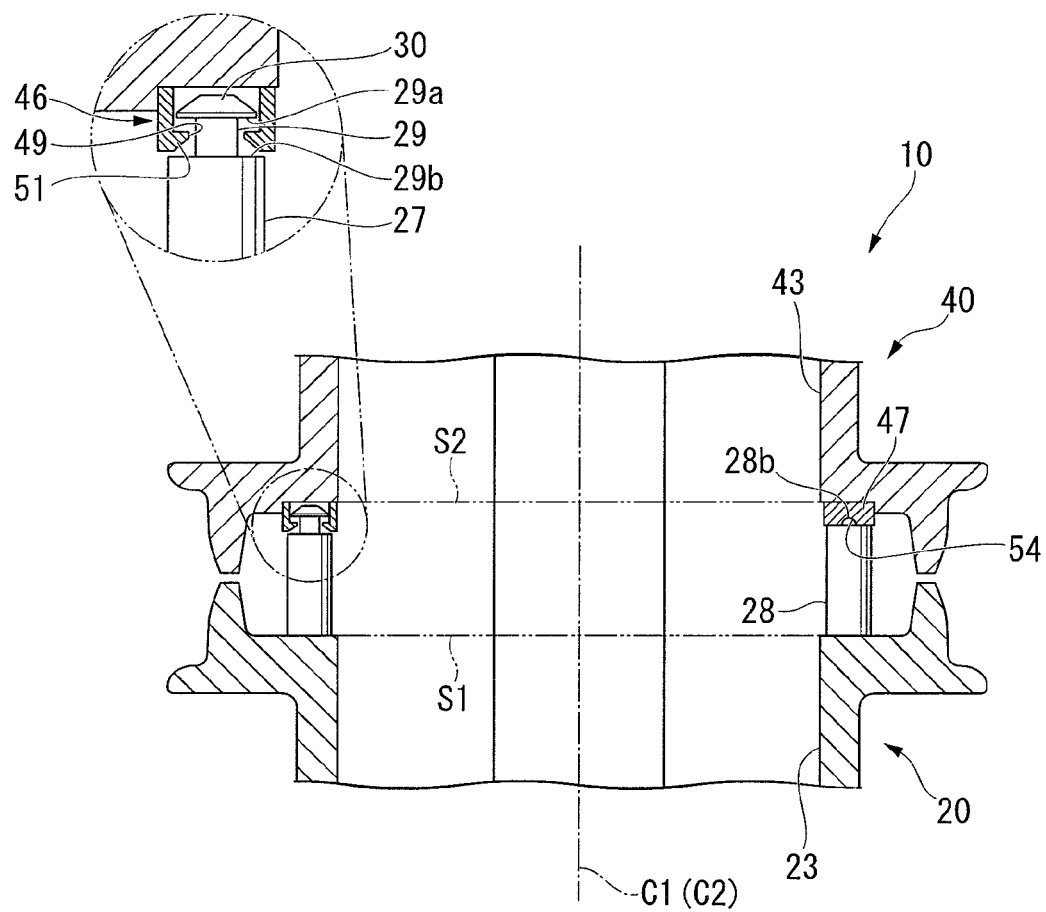
FIG. 11 is a cross-sectional view taken along cutting line A2-A2 in FIG. 10.
Figure 12:
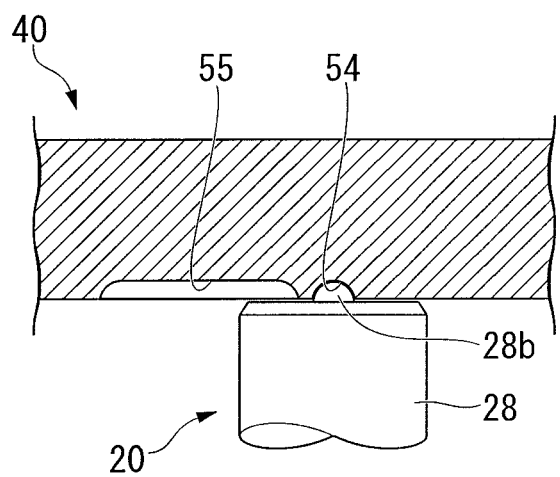
FIG. 12 is a cross-sectional view taken along cutting line A3-A3 in FIG. 10.
Figure 13:
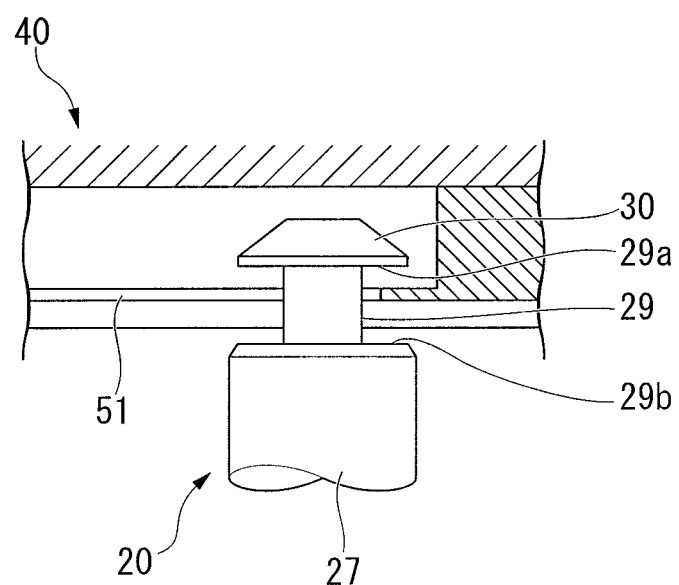
FIG. 13 is a cross-sectional view taken along cutting line A4-A4 in FIG. 10.

As shown in FIGS. 10 and 11, the concave portion 54 is provided at a position that faces the convex portion 28b of the stand 28 when the protruding portions 51 are arranged within the groove portion 29.

Figure 9:
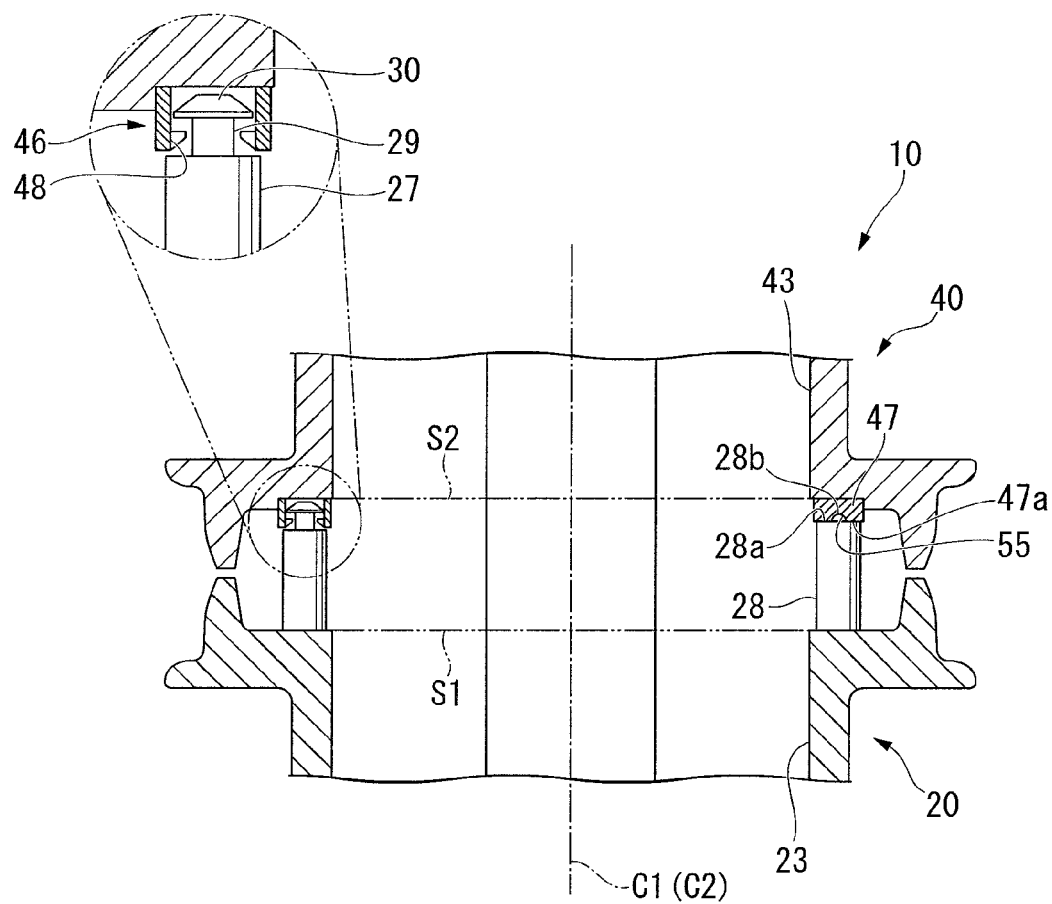
FIG. 9 is a cross-sectional view taken along cutting line A1-A1 in FIG. 8.

As shown in FIGS. 8 and 9, in a plan view, a guide concave portion 55 is formed so as to extend in the counterclockwise direction around the axis C2 from a position that faces the convex portion 28b when the projection portion 30 of the pin 27 is inserted into the inserting opening portion 48. The guide concave portion 55 is formed so as to extend toward the sliding opening portion 49 that communicate with the inserting opening portion 48 into which the projection portion 30 is inserted.

As shown in FIG. 8, in a plan view, if both of the rims 20 and 40 overlap each other so that the axes C1 and C2 coincide with each other, the convex portion 28b of the stand 28 and the concave portion 54 and the guide concave portion 55 of the stand receiving portion 47 are arranged on the circumferences of reference circles centered on the axes C1 and C2, respectively.

The concave portion 54 has a concave shape that is slightly larger than the convex portion 28b. The guide concave portion 55 has such a shape that the concave portion 54 extends around the axis C2.

As shown in FIG. 8, in a plan view, the concave portion 54 is arranged in the counterclockwise direction with respect to the guide concave portion 55 side by side so as to be set apart from each other around the axis C2.

The tire T that is a test object is attached to a portion closer to an edge portion than a portion where the pin receiving portions 46 and the stand receiving portions 47 are provided, in the principal surface 42a of the collar portion 42.

The engagement state of the rim assembly 10 will be described.

For example, when the rim assembly 10 is detached from the body unit 60 and arranged on the rim replacement unit 130, the lower rim 20 is arranged on a floor or the like, and the upper rim 40 engaged with the lower rim 20 is arranged on the lower rim 20.

As will be described below, in order to engage the lower rim 20 and the upper rim 40 with each other, the aforementioned pins 27 and pin receiving portions 46 are engaged with each other. At this time, the stands 28 and the stand receiving portions 47 abut against each other or are set apart from each other depending on the engagement state between the pins 27 and the pin receiving portions 46.

As shown in FIGS. 8 and 9, the upper rim 40 is arranged above the lower rim 20 so that the reference surfaces S1 and S2 face each other. The projection portions 30 of the pins 27 are inserted into the inserting opening portions 48, and the stands 28 are made to abut against the stand receiving portions 47. As a result, the groove portions 29 of the pins 27 are arranged on an extension line L of a protruding portion 51 around the axis C2, and the convex portions 28b of the stands 28 engage the guide concave portions 55 of the stand receiving portions 47. The lower through hole 23 of the lower rim 20 and the upper through hole 43 of the upper rim 40 are brought into a communication state.

As shown in FIGS. 10 and 11, if the lower rim 20 is rotated around the axis C1 with respect to the upper rim 40 from this state, the protruding portions 51 of the upper rim 40 are first arranged within the groove portions 29 of the lower rim 20 while the stands 28 abut against the stand receiving portions 47. Subsequently, the convex portions 28b is brought into the state of being engaged with the concave portions 54 from the state of being engaged with the guide concave portions 55 (refer to FIG. 12).

When the convex portions 28b ride over the guide concave portions 55 and move to the concave portions 54, the upper rim 40 temporarily moves up with respect to the lower rim 20. When the stands 28 abut against the stand receiving portions 47, the protruding portions 51 are set apart from both of the side surfaces 29a and 29b of the groove portions 29 (refer to FIG. 13).

Since the stand receiving portions 47 are formed in a circular-arc shape as mentioned above, even in any of a state where the pins 27 are inserted into the inserting opening portions 48 and a state where the protruding portions 51 are arranged within the groove portions 29, the stand receiving portions 47 and the stands 28 overlap each other in the direction of the axis C1, and the stands 28 can be made to abut against the stand receiving portions 47.

Figure 14:
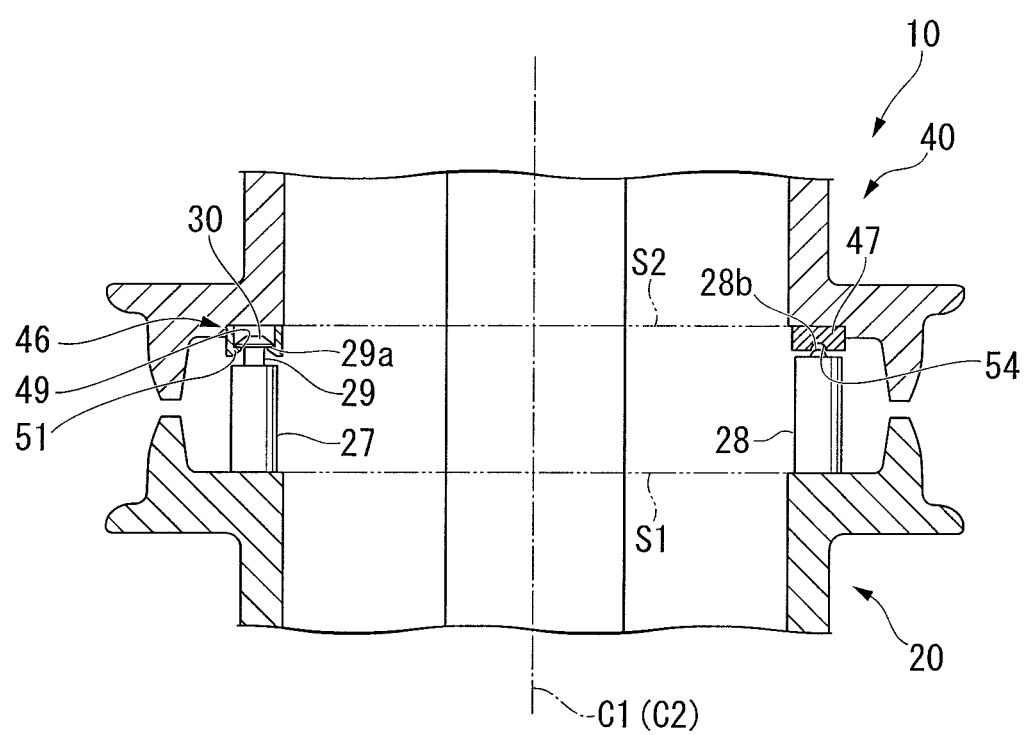
FIG. 14 is a cross-sectional view for describing a state where the upper rim in which the protruding portions are arranged within the groove portions of the pins of the lower rim is lifted.

As shown in FIG. 14, if the upper rim 40 is lifted upward from a state where the convex portions 28b engage the concave portions 54, the lower rim 20 moves so as to be set apart from the upper rim 40 due to the gravity that acts on the lower rim 20. The first reference surface S1 moves so as to be set apart from the second reference surface S2. At this time, the side surfaces 29a of the groove portions 29 engage the protruding portions 51, the pin receiving portions 46 support the pins 27, and the lower rim 20 is hung from the upper rim 40. The stands 28 are set apart from the stand receiving portions 47, and the engagement between the convex portions 28b and the concave portions 54 is released.

As described above, when the rim assembly 10 is detached from the body unit 60, both of the rims 20 and 40 engage each other by the protruding portions 51 being arranged within the groove portions 29.

On the other hand, when the rim assembly 10 is attached to the body unit 60, the engagement between both of the rims 20 and 40 is released. As will be described below, both of the rims 20 and 40 are fixed by an engaging mechanism 76.

As shown in FIG. 1, the body unit 60 has the lower spindle 62 that is rotatably supported on a base (supporting part) 61, and an elevating mechanism 63 and a fixing mechanism 64 attached to the base 61.

Figure 15:
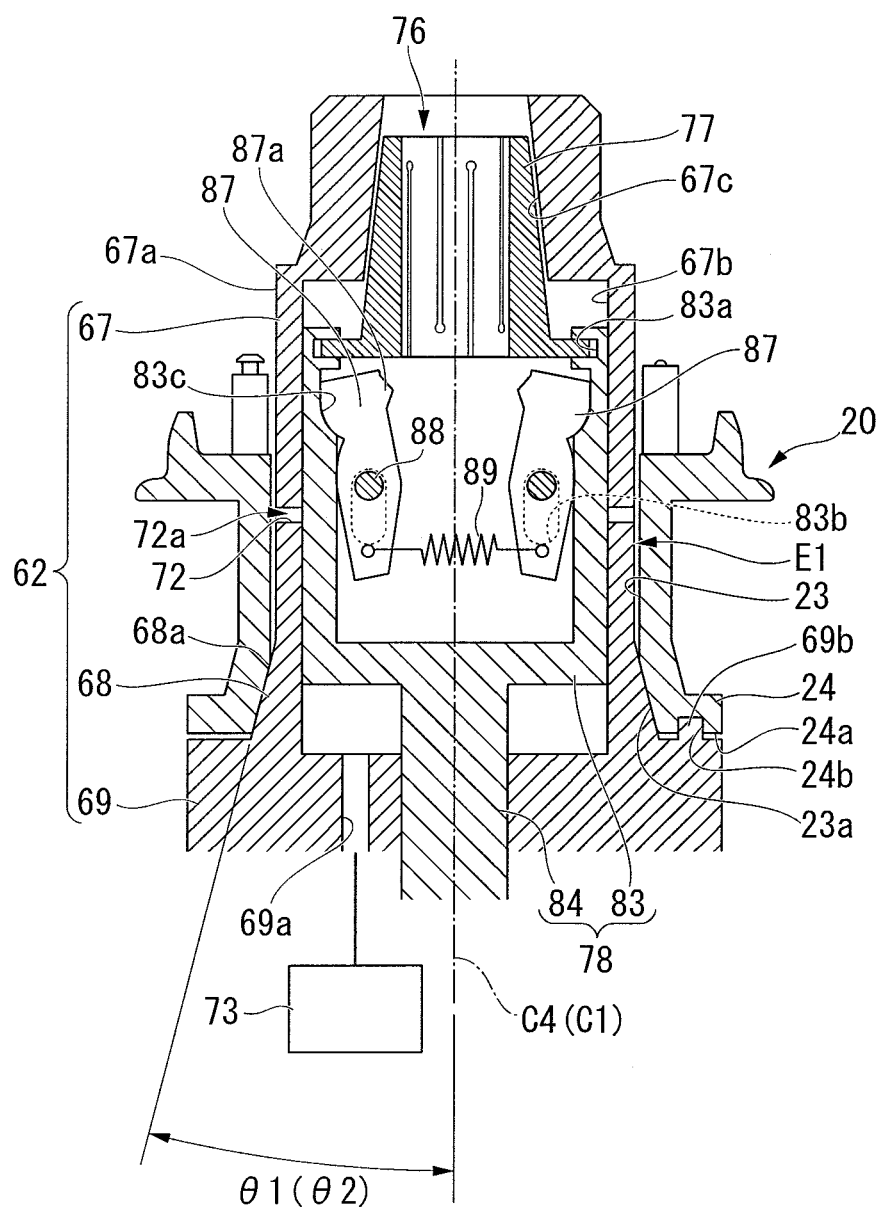
FIG. 15 is a cross-sectional view when an engaging mechanism of the tire uniformity measuring apparatus is brought into a standby state.

As shown in FIG. 15, the lower spindle 62 has a tube part (insertion part) 67 formed in a substantially cylindrical shape, a taper portion 68 provided at a lower end portion of the tube part 67, and enlarged-diameter portion 69 provided at a lower end portion of the taper portion 68. The taper portion 68 is formed with an apparatus-side inclined surface 68a that is enlarged in diameter from an outer peripheral surface 67a of the tube part 67 as being set apart from the tube part 67. The enlarged-diameter portion 69 is set to have a greater external diameter than the taper portion 68.

The external diameter of the tube part 67 is set so that the tube part can pass through the lower through hole 23 of the lower rim 20 and the upper through hole 43 of the upper rim 40.

Several dimensions are specified as shown in FIG. 2.

The length (bead diameter) from the tube part 67 to a fitting surface of the tire T is defined as D, the length of the lower through hole 23 in the direction of the axis C1 excluding the rim-side inclined surface 23a is defined as M, the distance between the inner peripheral surface of the lower through hole 23 and the tube part 67 is defined as Δd, and the inclination of the lower rim 20 is defined as Δa.

The relationship among the inclination Δa, the length D, the length M, and the distance Δd is artificially expressed by Expression (1).

$$\Delta a = (\Delta d \times D)/M \qquad (1)$$

In order to suppress the inclination Δa to be equal to or less than a predetermined value, the distance Δd is preferably set, for example, 0.005 to 0.01 mm.

As shown in FIG. 15, a conduit line of the tube part 67 has a larger-diameter portion 67b with a constant internal diameter on a lower side thereof and has a smaller-diameter portion 67c with a smaller internal diameter than the larger-diameter portion 67b on an upper side thereof. The smaller-diameter portion 67c is formed so that the internal diameter thereof becomes smaller towards the top. The tube part 67 is formed with a hole portion 72. The hole portion 72 has an opening 72a in the outer peripheral surface 67a of the tube part 67 and communicates with the larger-diameter portion 67b.

A hole portion for a tire (not shown) for supplying air to between the lower rim 20 and the upper rim 40 when the rim assembly 10 is attached to the lower spindle 62 is formed in the larger-diameter portion 67b so as to pass therethrough.

The hole portion 72 can be used to supply lubricating oil into the larger-diameter portion 67b from the outside of the lower spindle 62, when the rim assembly 10 is attached to the lower spindle 62.

As will be described below, when the rim-side inclined surface 23a is made to abut against the apparatus-side inclined surface 68a, the opening 72a is provided at a position that faces an inner peripheral surface of the lower rim 20.

The apparatus-side inclined surface 68a is formed in the shape of an outside surface of a truncated cone that has an axis C4 of the lower spindle 62 as its central axis. An angle θ1 formed between the axis C4 and the apparatus-side inclined surface 68a is set to be equal to an angle θ2 formed between the axis C1 of the lower rim 20 and the rim-side inclined surface 23a.

The enlarged-diameter portion 69 is formed with a vent hole 69a that communicate with the larger-diameter portion 67b. The vent hole 69a is connected to an air supply source (pneumatic supply part) 73 and can supply compressed air (gas) into the larger-diameter portion 67b through the vent hole 69a. The air supplied into the larger-diameter portion 67b is discharged to the outside through the hole portion for a tire.

An upper surface of the enlarged-diameter portion 69 is formed with a positioning convex portion 69b that engages the aforementioned positioning hole portion 24b.

A state where the lower rim 20 is attached to the lower spindle 62 will be described.

As shown in FIG. 15, the lower rim 20 is lowered while the lower through hole 23 of the lower rim 20 is inserted to the lower spindle 62 and the orientation of the lower rim 20 around the axis C1 is adjusted.

If the positioning hole portion 24b is engaged with the positioning convex portion 69b and the rim-side inclined surface 23a of the lower rim 20 is caused to abut against the apparatus-side inclined surface 68a of the lower spindle 62, the rim-side inclined surface 23a comes into surface contact with the apparatus-side inclined surface 68a.

In this case, a small clearance E1 is formed between the outer peripheral surface 67a of the tube part 67 and the inner peripheral surface of the lower through hole 23, which results in a state where the second collar portion 24 is set apart from the enlarged-diameter portion 69. The lower rim 20 is mainly supported by the apparatus-side inclined surface 68a, and the tube part 67 prevents the lower rim from tilting.

If the upper through hole 43 of the upper rim 40 is further inserted to the lower spindle 62, a small clearance is formed between the outer peripheral surface 67a of the tube part 67 and an inner peripheral surface of the upper through hole 43.

The engaging mechanism 76 is built in the lower spindle 62. The engaging mechanism 76 is, for example, a well-known fixing mechanism described in Japanese Patent No. 3040514. The engaging mechanism 76 has a taper sleeve 77 and a hook operating rod 78 connected to the taper sleeve 77 as main constituent elements.

Figure 16:
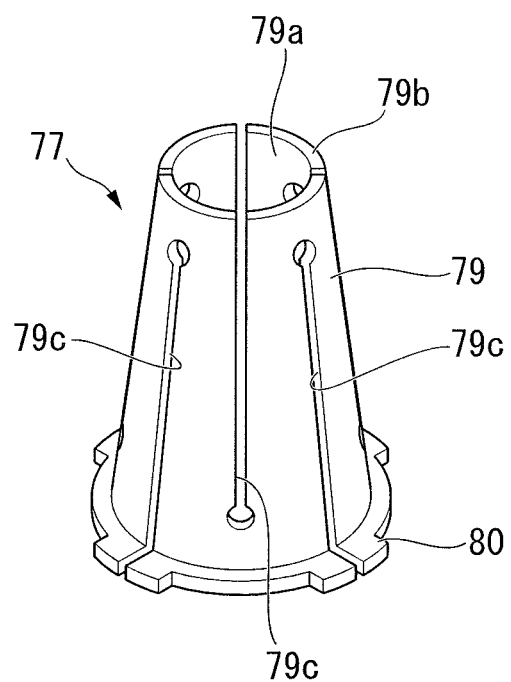
FIG. 16 is a perspective view of a taper sleeve built in the lower spindle.

As shown in FIG. 16, the taper sleeve 77 has a body 79 formed in the shape of a substantially truncated cone, and a flange portion 80 provided at an outer peripheral surface of a lower end of the body 79.

A through hole 79a is formed in the direction of the axis C4 in the body 79. A side wall 79b of the body 79 is formed with a plurality of slits 79c that pass through the side wall 79b in the thickness direction and extend along the axis C4 of the body 79. As the taper sleeve 77 receives a compressive force in the radial direction, the width of the slits 79c becomes small and the internal diameter of the through hole 79a can be made small.

As shown in FIG. 15, the hook operating rod 78 has a cylindrical portion 83 formed in a bottomed tubular shape, and a shaft-like member 84 that is fixed to a bottom surface of the cylindrical portion 83 and extends downward. An upper end of an inner peripheral surface of the cylindrical portion 83 is formed with an annular groove 83a that engages the flange portion 80 of the taper sleeve 77. The cylindrical portion 83 is formed with a pair of elongated holes 83b that pass through a wall portion and have an up-and-down direction as a long axis.

A cylinder (not shown) or the like is connected to a lower end of the shaft-like member 84 so that the hook operating rod 78 can be moved up and down.

A pair of hooks 87 is arranged within the cylindrical portion 83 so as to face each other across the axis C4. Both ends of a pin 88 that servers as a fulcrum of each hook 87 are fixed to the lower spindle 62 through each elongated hole 83b of the cylindrical portion 83. A spring 89 is connected to lower end portions of the hooks 87, and bias the lower end portions of the hooks 87 so as to approach each other.

An engaging claw 87a is provided so as to protrude from a region of an upper end portion of each hook 87 that faces the axis C4.

In a standby state shown in FIG. 15, the hook operating rod 78 of the engaging mechanism 76 moves downward with respect to the lower spindle 62. A slight clearance is formed between an outer peripheral surface of the taper sleeve 77 and the smaller-diameter portion 67c of the tube part 67 in a natural state. Moreover, the upper end portions of the hooks 87 enter a concaved portion 83c formed in the inner peripheral surface of the cylindrical portion 83 by being biased by the spring 89, and the distance between the engaging claws 87a is made greater than the external diameter of an upper rim shaft 112 to be described below.

Figure 17:
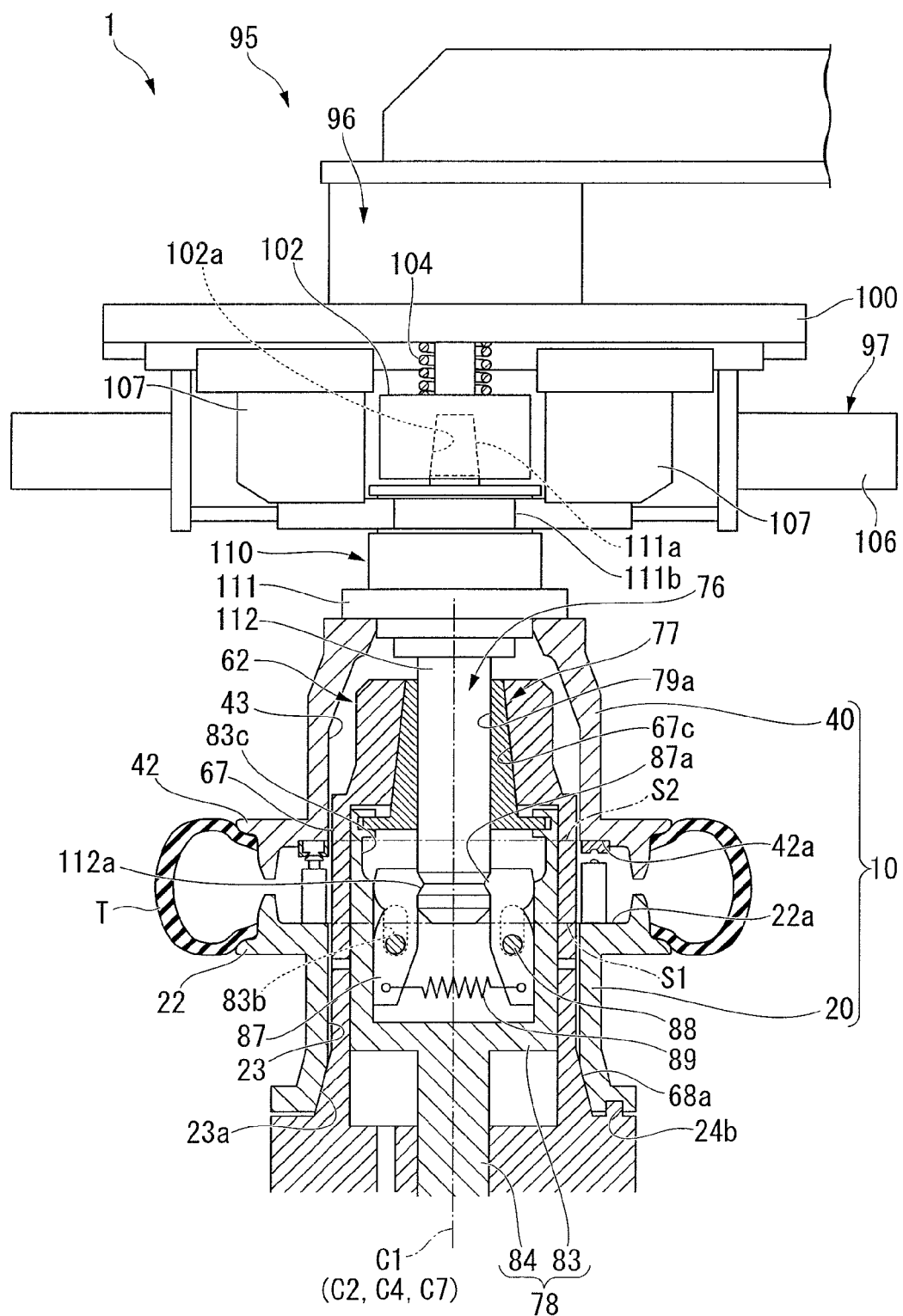
FIG. 17 is a cross-sectional view when the engaging mechanism is brought into an engagement state.

On the other hand, in a fixed state shown in FIG. 17, the hook operating rod 78 of the engaging mechanism 76 moves upward. As the taper sleeve 77 moves upward and is pushed into the smaller-diameter portion 67c, the taper sleeve is compressed in the radial direction and the internal diameter of the through hole 79a becomes small. As the hook operating rod 78 moves upward with respect to the hooks 87, the upper end portions of the hooks 87 are pushed out of the concaved portion 83c, and the distance between the engaging claws 87a becomes short. At this time, since the pins 88 move within the elongated holes 83b, the pins 88 do not constrain the movement of the hook operating rod 78.

The lower spindle 62 is supported on the base 61 by a bearing (not shown). The lower spindle 62 can be rotated around the axis C4 by a servo motor (rotating part) 90 shown in FIG. 1.

The elevating mechanism 63 has a frame 93 fixed to the base 61, and a rim lifting and lowering device 95 attached to the frame 93 via a ball screw 94. The rim lifting and lowering device 95 can be moved in the up-and-down direction by the ball screw 94.

Figure 18:
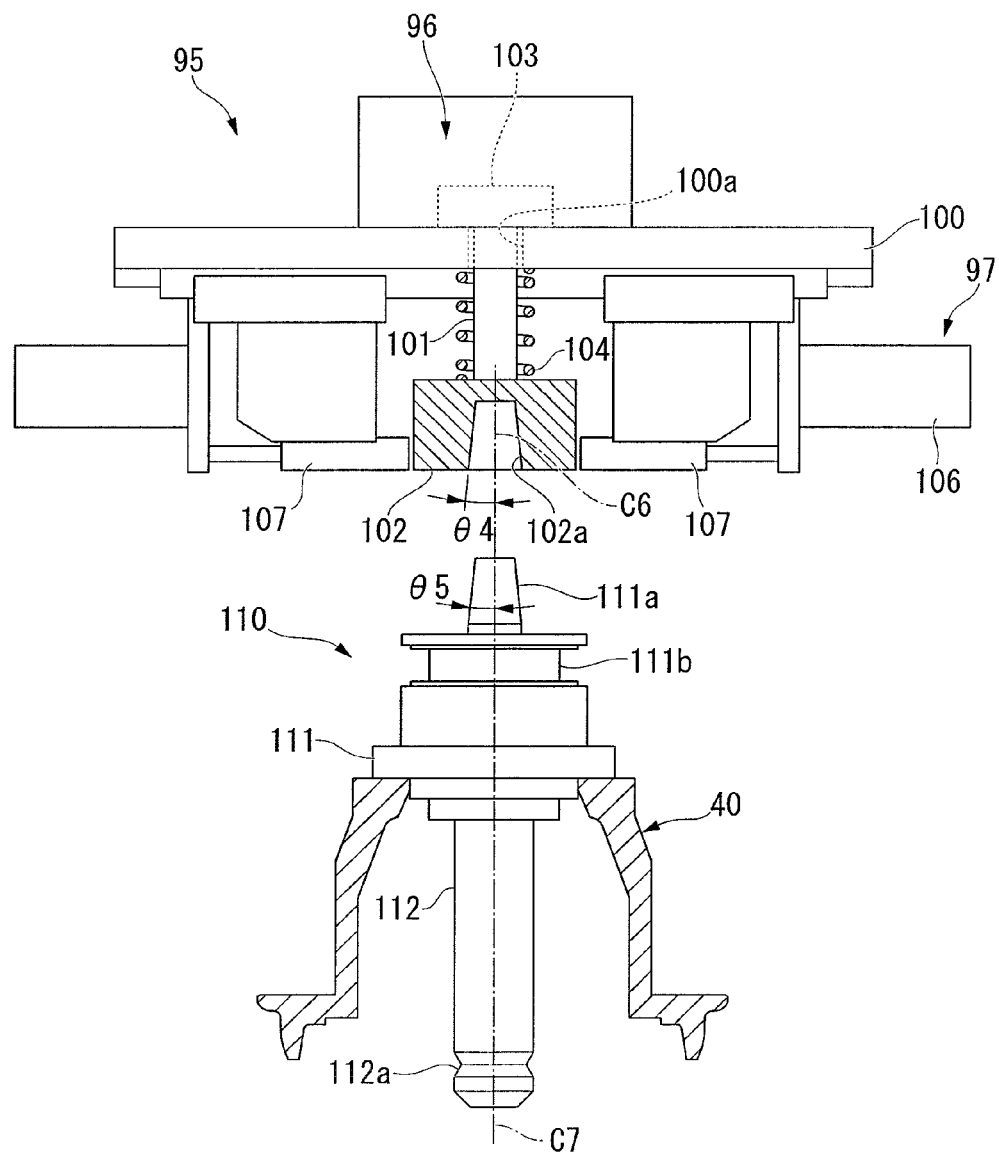
FIG. 18 is a cross-sectional view describing a state where a connecting adapter is detached from a rim lifting and lowering device of the tire uniformity measuring apparatus.

As shown in FIG. 18, the rim lifting and lowering device 95 has the positioning part 96 and the chuck part (clamping part) 97.

The positioning part 96 has a rod 101 inserted into a through hole 100a formed in a supporting plate 100, a substantially disk-shaped positioning member 102 fixed to a lower end of the rod 101, and a supporting member 103 fixed to an upper end of the rod 101.

A lower surface of the positioning member 102 is formed with a second apparatus-side inclined surface 102a that is enlarged in diameter towards the bottom. The second apparatus-side inclined surface 102a is formed in the shape of an internal surface of a truncated cone and is exposed toward an axis C6 of the positioning member 102. In other words, the second apparatus-side inclined surface 102a is turned toward the axis C6.

A spring 104 through which the rod 101 is inserted is locked to a lower surface of the supporting plate 100 and an upper surface of the positioning member 102, respectively, and generates a force to set the supporting plate 100 and the positioning member 102 apart from each other irrespective of the distance between the supporting plate 100 and the positioning member 102.

The external diameter of the supporting member 103 is set to be greater than the external diameter of the through hole 100a. The supporting member 103 is locked to an upper surface of the supporting plate 100.

The chuck part 97 has an air cylinder 106, and a pair of gripping members 107 that is slidable in a direction parallel to the horizontal surface.

The aforementioned positioning part 96 and chuck part 97 are attached to and detachable from a connecting adapter 110 attached to the upper rim 40.

The connecting adapter 110 has an adapter body (connecting part) 111 detachably attached to the upper rim 40 by bolts or the like (not shown), and an upper rim shaft 112 fixed to a lower portion of the adapter body 111. The adapter body 111 and the upper rim shaft 112 may be integrally formed or may be joined together after being separately formed.

An upper portion of the adapter body 111 is formed with an upper rim-side inclined surface 111a. The upper rim-side inclined surface 111a is formed in the shape of a side surface of a truncated cone, and is exposed to a side opposite to an axis C7 side of the connecting adapter 110. In other words, the upper rim-side inclined surface 111a is exposed to the side opposite to the axis C7 side.

An angle θ4 formed between the aforementioned axis C6 and second apparatus-side inclined surface 102a is set to be equal to an angle θ5 formed between the axis C7 and the upper rim-side inclined surface 111a. An outer peripheral surface of the adapter body 111 is formed with an engaging groove 111b that engages the gripping members 107.

An outer peripheral surface of a lower end portion of the upper rim shaft 112 is formed with an engaging concave portion 112a that engages the aforementioned engaging claws 87a.

A procedure when the connecting adapter 110 is attached to the rim lifting and lowering device 95 becomes the following procedure.

A clearance between the pair of gripping members 107 is expanded by the air cylinder 106 in advance.

As shown in FIG. 17, the adapter body 111 is inserted into the positioning member 102, and the upper rim-side inclined surface 111a is made to abut against the second apparatus-side inclined surface 102a. The gripping members 107 are engaged with the engaging groove 111b of the adapter body 111 in a state where the connecting adapter 110 is moved toward the supporting plate 100 against the biasing force of the spring 104.

Since the connecting adapter 110 is engaged by the gripping members 107 positioned and adjusted to keep a relative center, the connecting adapter is aligned in the direction of the axis C7 of the connecting adapter 110 and the direction parallel to the horizontal surface. Moreover, as the upper rim-side inclined surface 111a is biased downward by the second apparatus-side inclined surface 102a, the connecting adapter 110 is more reliably positioned in a direction parallel to the horizontal surface orthogonal to the axis C7.

Figure 19:
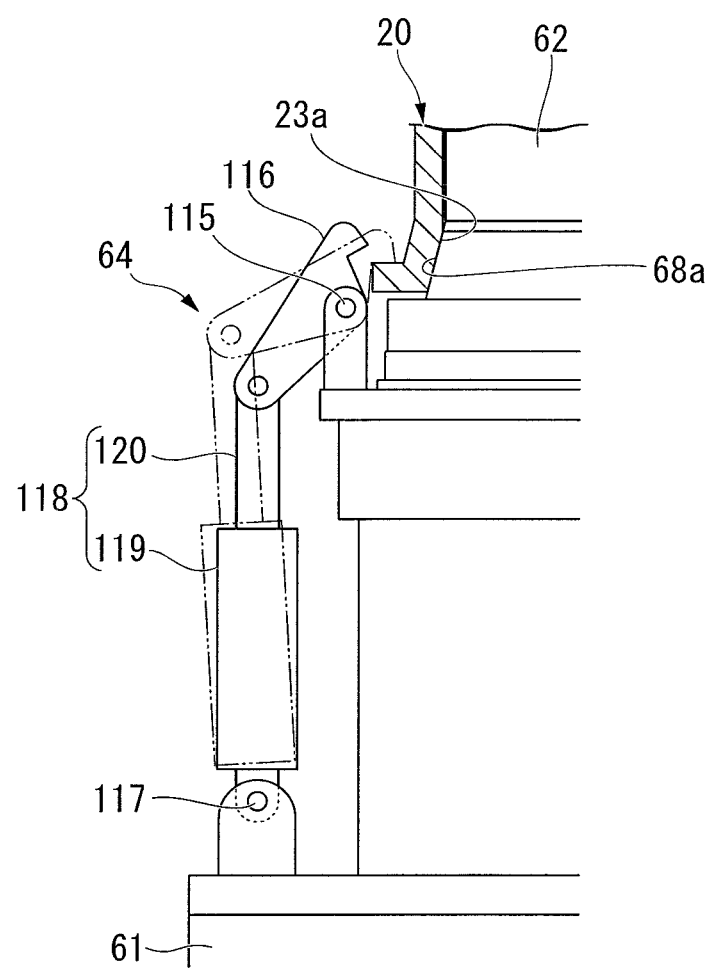
FIG. 19 is a front view of a fixing mechanism of the tire uniformity measuring apparatus.

As shown in FIGS. 1 and 19, a pair of the fixing mechanisms 64 are attached to the base 61 with the lower spindle 62 interposed therebetween.

Each fixing mechanism 64 has a hook 116 that is rotatably supported around a shaft member 115 attached to the base 61, and a piston portion 118 that has a base end rotatably supported around a shaft member 117 attached to the base 61.

The piston portion 118 can advance and retreat the piston rod 120 with respect to a cylinder 119 connected to the shaft member 117. A tip of the piston rod 120 is rotatably connected to a base end of hook 116.

The fixing mechanism 64 is brought into a fixing state where the hook 116 fixes the lower rim 20 attached to the lower spindle 62 on the apparatus-side inclined surface 68*a* as the piston rod 120 is pushed out from the cylinder 119 (shown by a two-dot chain line in FIG. 19).

On the other hand, the fixing mechanism 64 is brought into a release state where this fixation is released as the piston rod 120 is pulled back toward the cylinder 119.

The fixing mechanism 64 can be switched between the fixing state and the release state.

As shown in FIG. 1, a load wheel 124 is arranged on a rail 123 in the base 61. As the load wheel 124 travels on the rail 123, the load wheel can be brought close to the lower spindle 62 or can be set apart from the lower spindle 62.

In the rim replacement unit 130, as a swivel base 131 travels on a rail 132, the swivel base 131 can be brought close to the lower spindle 62 or can be set apart from the lower spindle 62. An upper portion of the swivel base 131 is provided with a swivel shaft 133. A plurality of stocker frames 134 are connected to the swivel shaft 133. The swivel shaft 133 rotates the stocker frames 134 around the axis of the swivel shaft 133. As a result, the swivel shaft 133 can bring the rim assemblies 10 arranged on rim pedestals 135 of the stocker frames 134 close to the lower spindle 62 or can separate the rim assemblies from the lower spindle 62.

Since the positioning convex portion 69*b* (refer to FIG. 21) is formed on each stocker frame 134, the phase of the rim assembly 10 arranged on the stocker frame 134 around the axis C1 is positioned.

The operation of the tire measuring apparatus 1 will be described.

A case where a rim assembly 10 to be attached to the body unit 60 is replaced and a case where a tire T is mounted on the rim assembly 10 attached to the body unit 60 so as to perform measurement will be described, respectively. These operations are performed on the basis of control of the control unit.

The case where the rim assembly 10 is replaced will be described.

As shown in FIG. 1, the lower rim 20 and the upper rim 40 are separated from each other. The lower rim 20 is attached to the lower spindle 62, and the connecting adapter 110 fixed to the upper rim 40 is attached to the rim lifting and lowering device 95 and moves upward. At this time, the engaging mechanism 76 within the lower spindle 62 is in the standby state, the fixing mechanisms 64 are in the release state, and the load wheel 124 and the swivel base 131 are set apart from the lower spindle 62.

Figure 20:
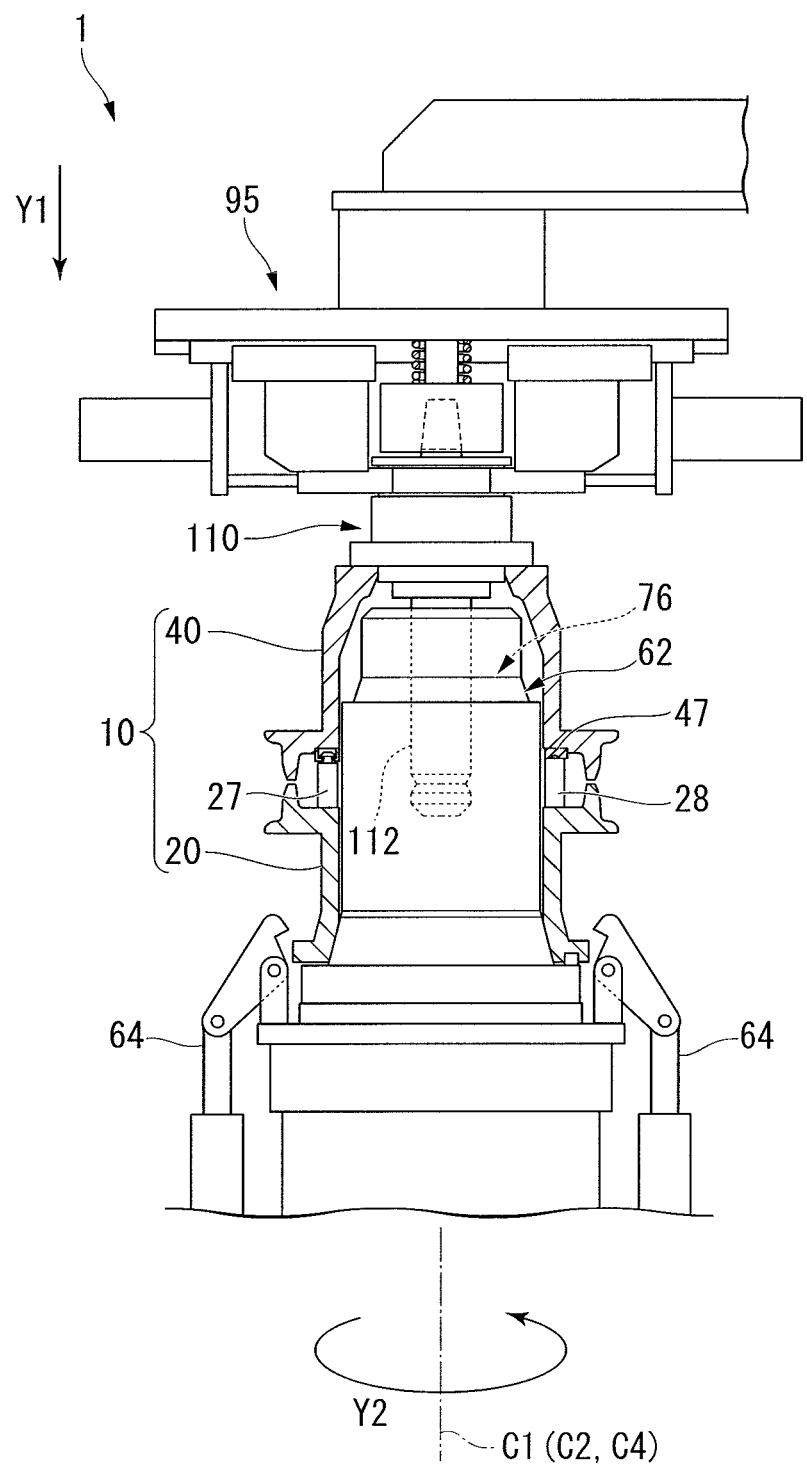
FIG. 20 is a view describing the operation of replacing the rim assembly in the tire uniformity measuring apparatus.

As shown by arrow Y1 of FIG. 20, the rim lifting and lowering device 95 is lowered from this state to move the upper rim 40 downward, and the upper rim 40 is superimposed on the lower rim 20.

The phase relationship between both of the rims 20 and 40 at this time is as shown in FIGS. 8 and 9, and the convex portions 28*b* engages the guide concave portions 55 in a state where the stand receiving portions 47 abut against the stands 28. Additionally, the projection portions 30 of the pins 27 are inserted into the inserting opening portions 48.

The upper rim shaft 112 is inserted into the engaging mechanism 76. At this time, since the engaging mechanism 76 is in the standby state, the engaging claws 87*a* of the hooks 87 do not engage the engaging concave portion 112*a* of the upper rim shaft 112.

Next, as shown by arrow Y2 of FIG. 20, the lower rim 20 is rotated in the counterclockwise direction around the axis C1 together with the lower spindle 62 by a servo motor 90. The phase relationship between both of the rims 20 and 40 at this time is as shown in FIGS. 10 and 11. By the rotation of the lower rim 20, the protruding portions 51 of the upper rim 40 are arranged within the groove portions 29 of the pins 27 while the stands 28 abut against the stand receiving portions 47, the pin receiving portions 46 and the pins 27 engage each other, and the lower rim 20 and the upper rim 40 are integrated. The convex portions 28*b* engage the concave portions 54.

Subsequently, as shown by arrow Y3 of FIG. 21, the rim lifting and lowering device 95 is lifted, and the rim assembly 10 in which both of the rims 20 and 40 are integrated are moved upward. At this time, as shown in FIG. 14, since the pin receiving portions 46 of the upper rim 40 support the pins 27, the lower rim 20 are hung from the upper rim 40.

Figure 21:
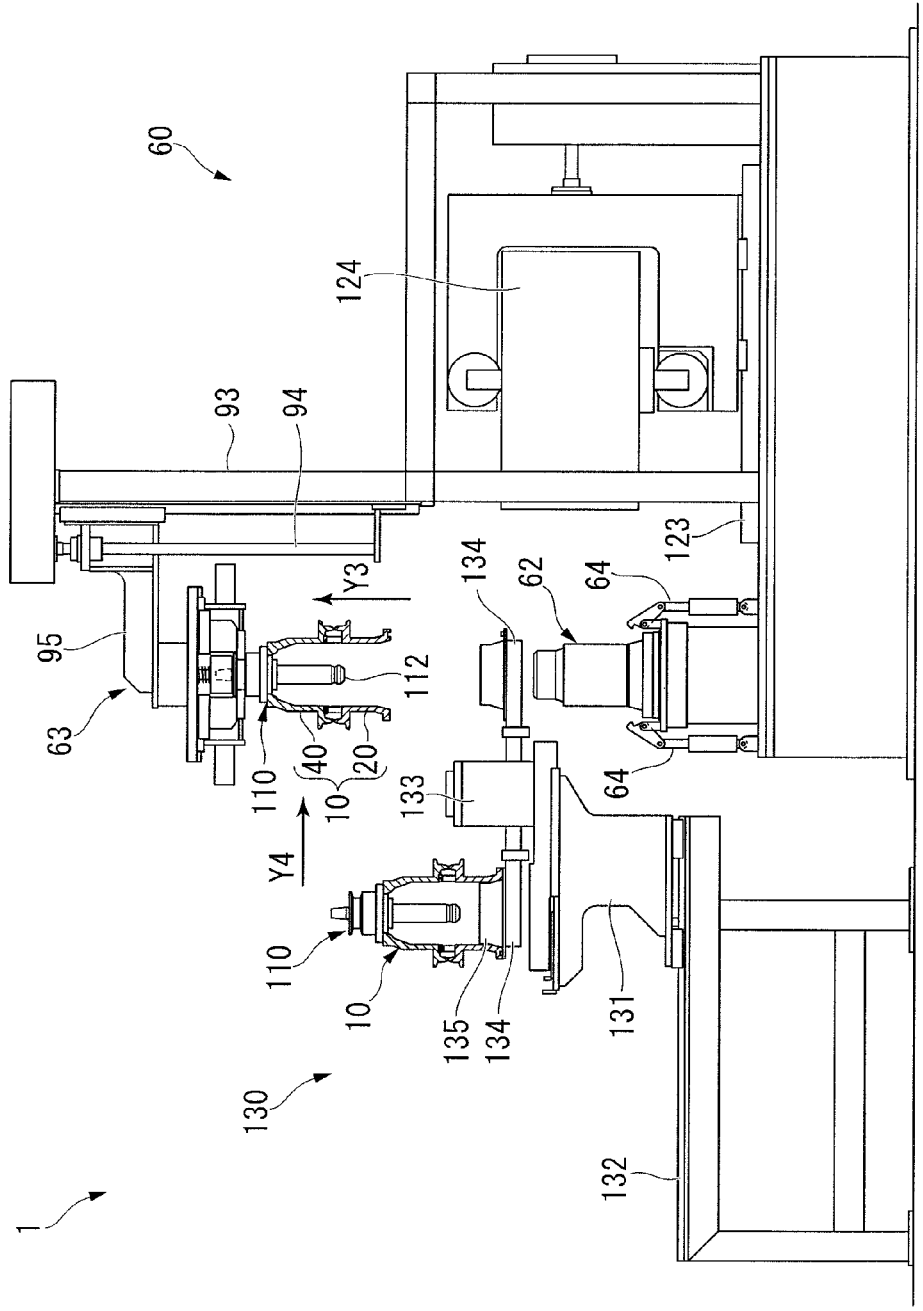
FIG. 21 is a view describing the operation of replacing the rim assembly in the tire uniformity measuring apparatus.

As shown by arrow Y4 of FIG. 21, the rim replacement unit 130 is brought close to the lower spindle 62. At this time, a stocker frame 134 on which no rim assembly 10 is arranged is arranged below the rim assembly 10 supported by the rim lifting and lowering device 95.

Figure 22:
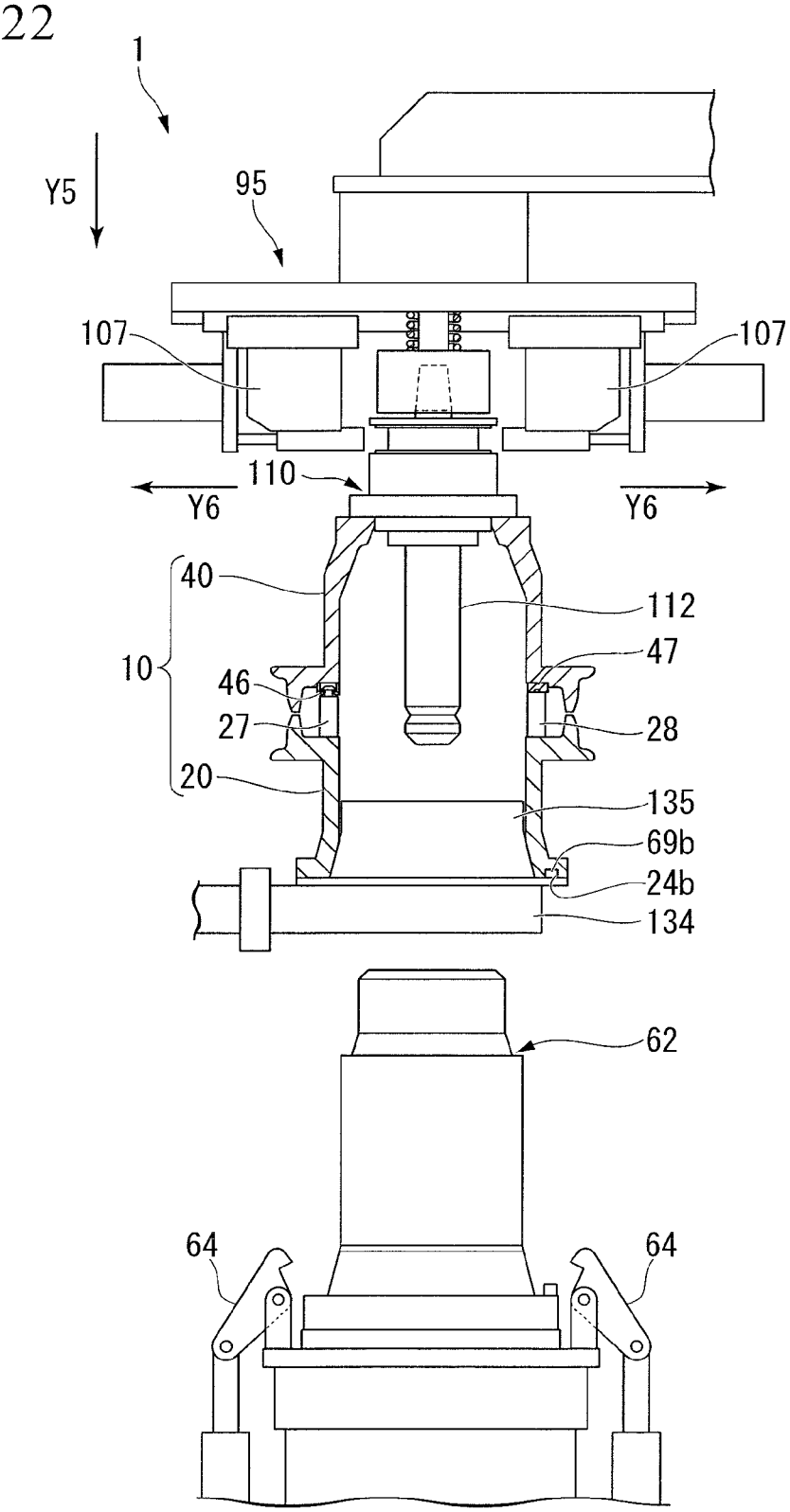
FIG. 22 is a view describing the operation of replacing the rim assembly in the tire uniformity measuring apparatus.
Figure 23:
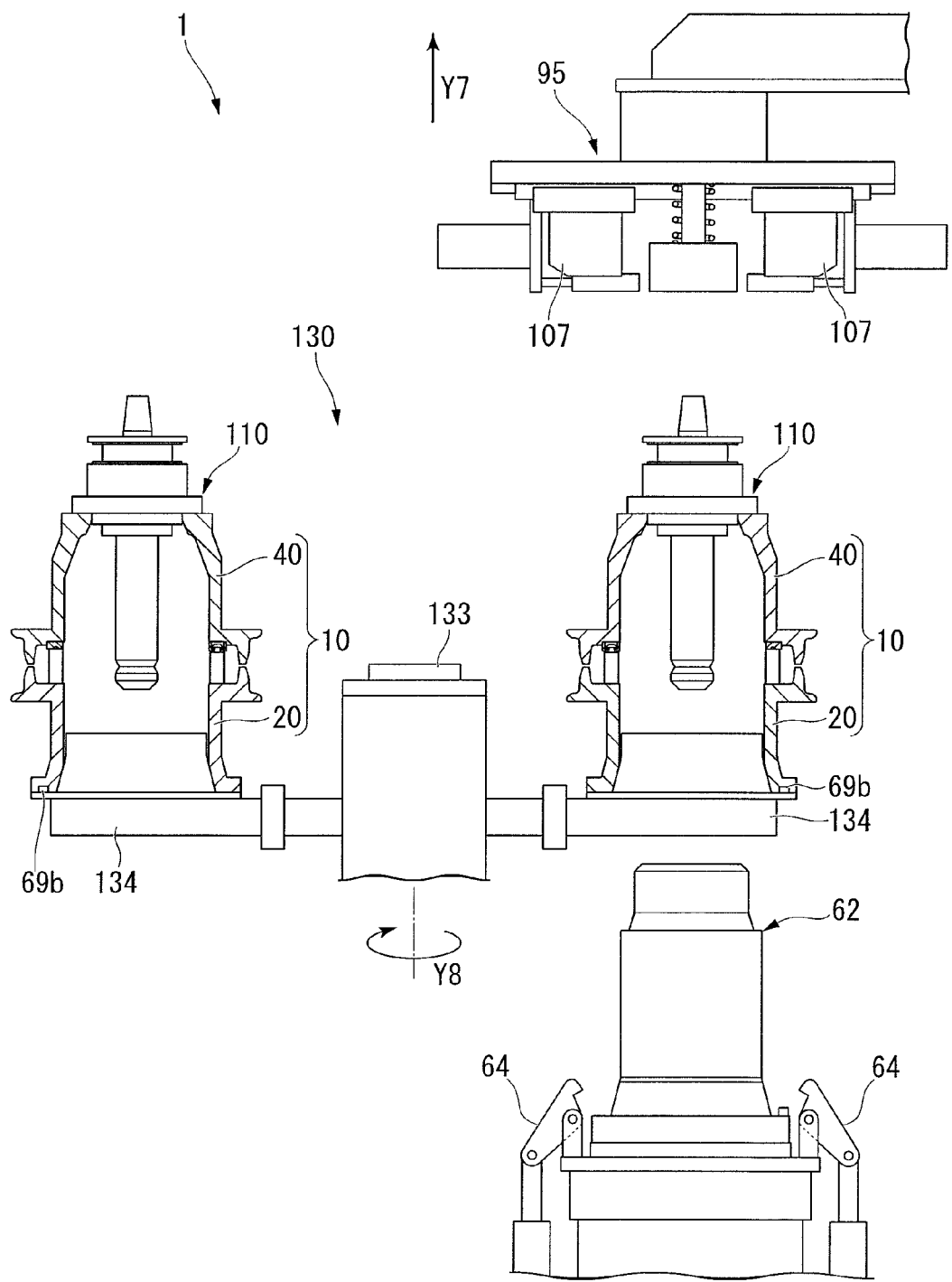
FIG. 23 is a view describing the operation of replacing the rim assembly in the tire uniformity measuring apparatus.

Next, as shown by arrow Y5 of FIG. 22, the rim lifting and lowering device 95 is lowered, and the rim assembly 10 to which the connecting adapter 110 is attached is arranged at the rim pedestal 135 on the stocker frame 134. At this time, the positioning hole portion 24*b* of the lower rim 20 is engaged with the positioning convex portion 69*b* that protrudes onto the stocker frame 134.

As a result, the stand receiving portions 47 abut against the stands 28, and the lower rim 20 supports the upper rim 40. At this time, the pins 27 and the pin receiving portions 46 do not interfere with each other and the pins 27 do not support the load of the upper rim 40, so that damage to the pins 27 can be prevented.

If the rim assembly 10 is arranged on the stocker frame 134, as shown by arrow Y6 of FIG. 22, the pair of gripping members 107 that support the connecting adapter 110 are moved so as to be set apart from each other, and the rim assembly 10 is detached from the rim lifting and lowering device 95. As shown by arrow Y7 of FIG. 23, the rim lifting and lowering device 95 is lifted and set apart from the rim replacement unit 130.

Thereafter, as shown by arrow Y8, the stocker frame 134 is rotated around the axis of the swivel shaft 133, and a rim assembly 10 of a type that is different from the rim assembly 10 attached to the body unit 60 up to now is located below the rim lifting and lowering device 95.

Figure 24:
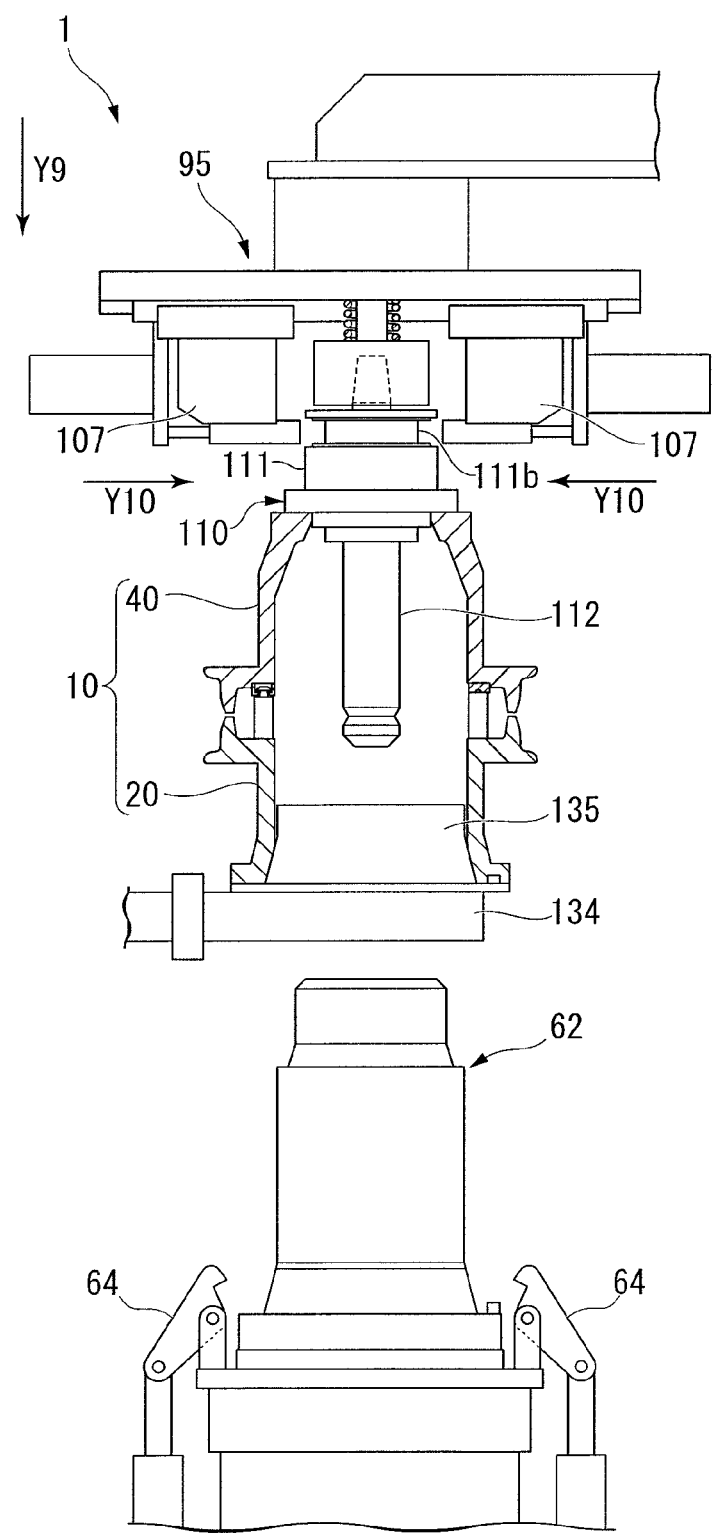
FIG. 24 is a view describing the operation of replacing the rim assembly in the tire uniformity measuring apparatus.

Next, as shown by arrow Y9 of FIG. 24, the rim lifting and lowering device 95 is lowered, and the gripping members 107 are moved so as to grip the engaging groove 111*b* of the adapter body 111. As shown by arrow Y10, the gripping members 107 are brought close to each other and the engaging groove 111*b* is engaged with the gripping members 107. At this time, the lower rim 20 and the upper rim 40 of the rim assembly 10 are engaged with each other.

Figure 25:
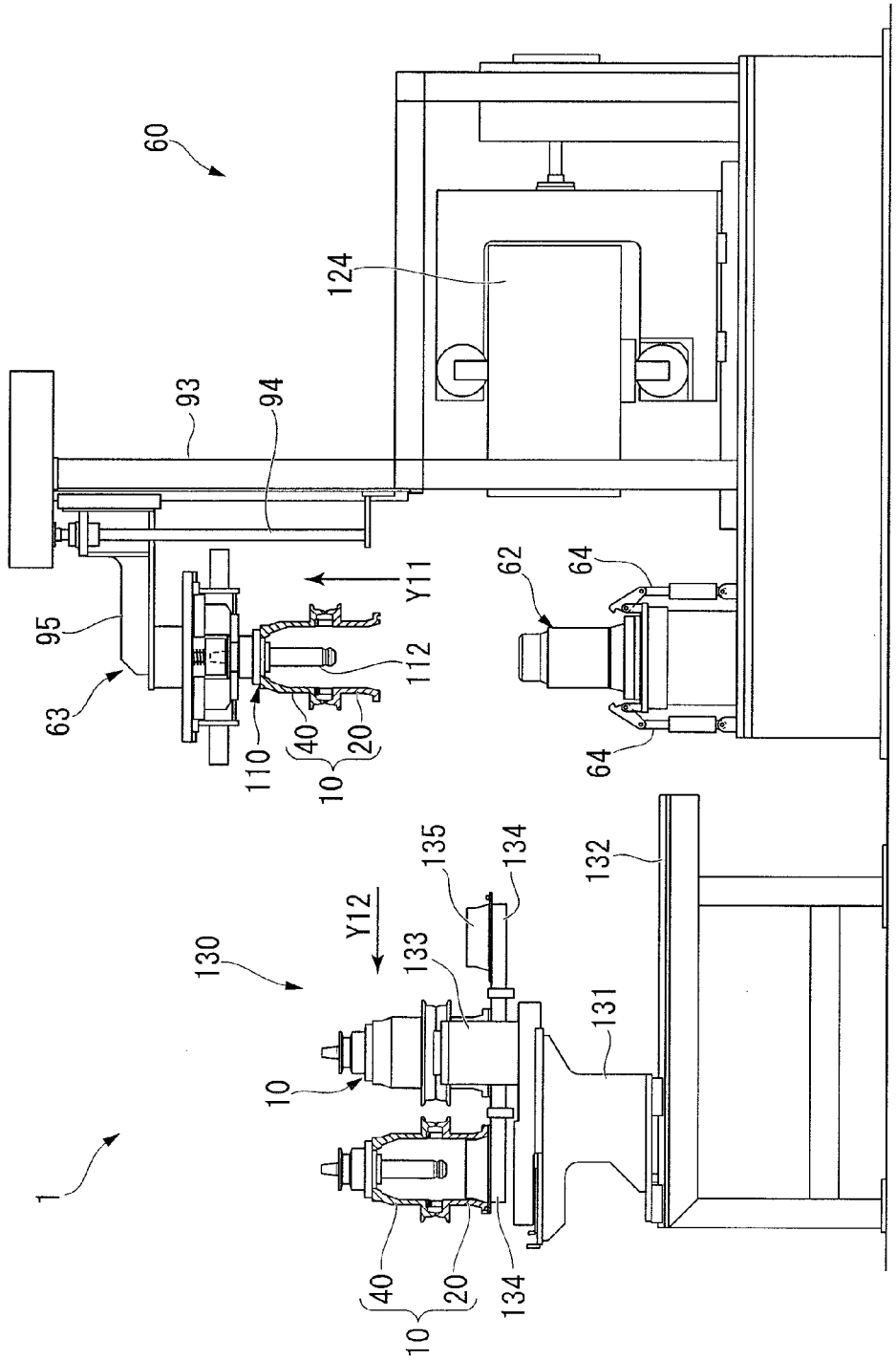
FIG. 25 is a view describing the operation of replacing the rim assembly in the tire uniformity measuring apparatus.

As shown by arrow Y11 of FIG. 25, the rim lifting and lowering device 95 engaged with the rim assembly 10 is lifted. As shown by arrow Y12, the rim replacement unit 130 is set apart from the lower spindle 62, and the stocker frame 134 of the rim replacement unit 130 is retracted from above the lower spindle 62.

Figure 26:
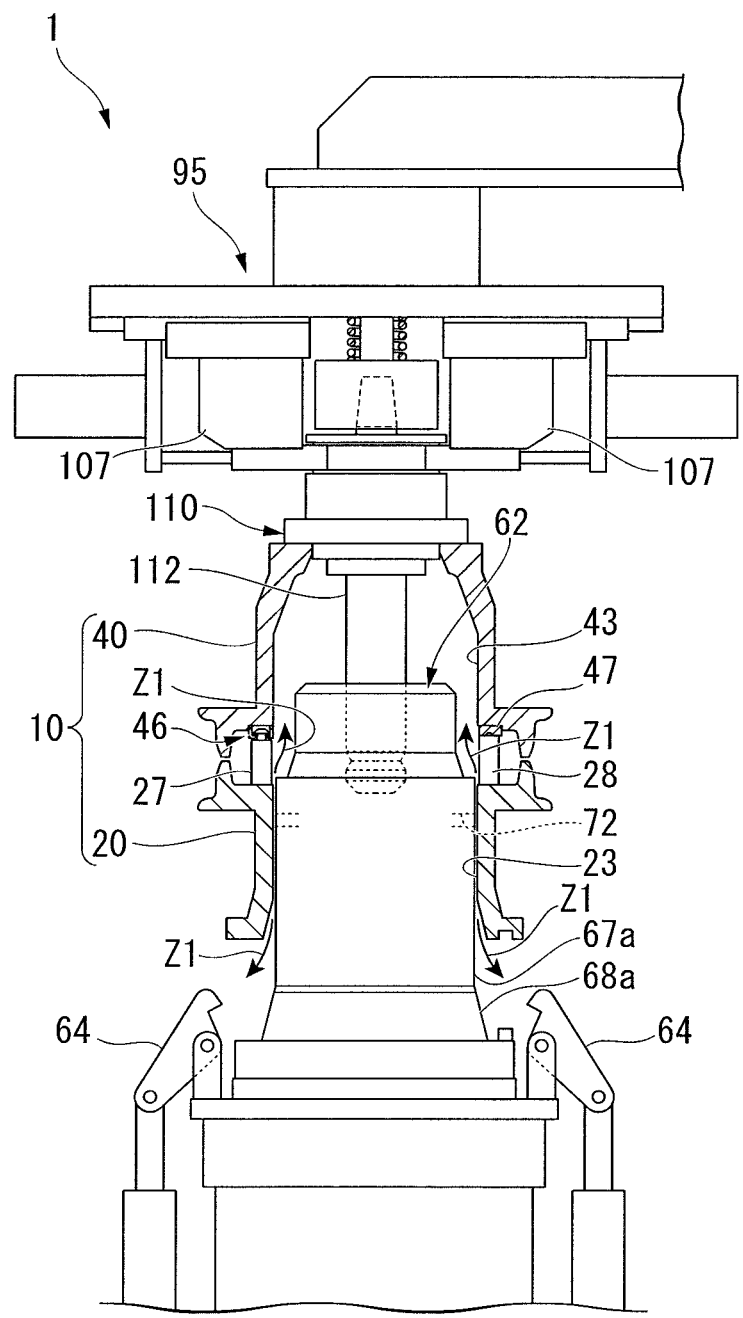
FIG. 26 is a view describing the operation of replacing the rim assembly in the tire uniformity measuring apparatus.

Subsequently, as shown in FIG. 26, the rim lifting and lowering device 95 is lowered and the rim assembly 10 is attached to the lower spindle 62. At this time, the lower spindle 62 is inserted into the lower through hole 23 of the lower rim 20 and the upper through hole 43 of the upper rim 40.

However, as mentioned above, since the clearance between the lower through hole 23 and the lower spindle 62 is small, the lower spindle 62 may not be able to be smoothly inserted into the lower through hole 23. Even in this case, as the upper rim 40 is pushed downward in the rim lifting and lowering device 95, the stands 28 of the lower rim 20 are pushed downward by the stand receiving portions 47 of the upper rim 40, and the lower spindle 62 is inserted into the lower through hole 23.

Additionally, for example, after the rim assembly 10 is detached, dust or the like may adhere to the outer peripheral surface 67a of the lower spindle 62 or the apparatus-side inclined surface 68a. In this case, this dust is blown away by supplying air by an air supply source 73 to discharge the air from the hole portion 72 in a state where the inner peripheral surface of the lower through hole 23 is made to face the opening 72a, thereby causing the air to flow downward or upward as shown by arrow Z1.

Figure 27:
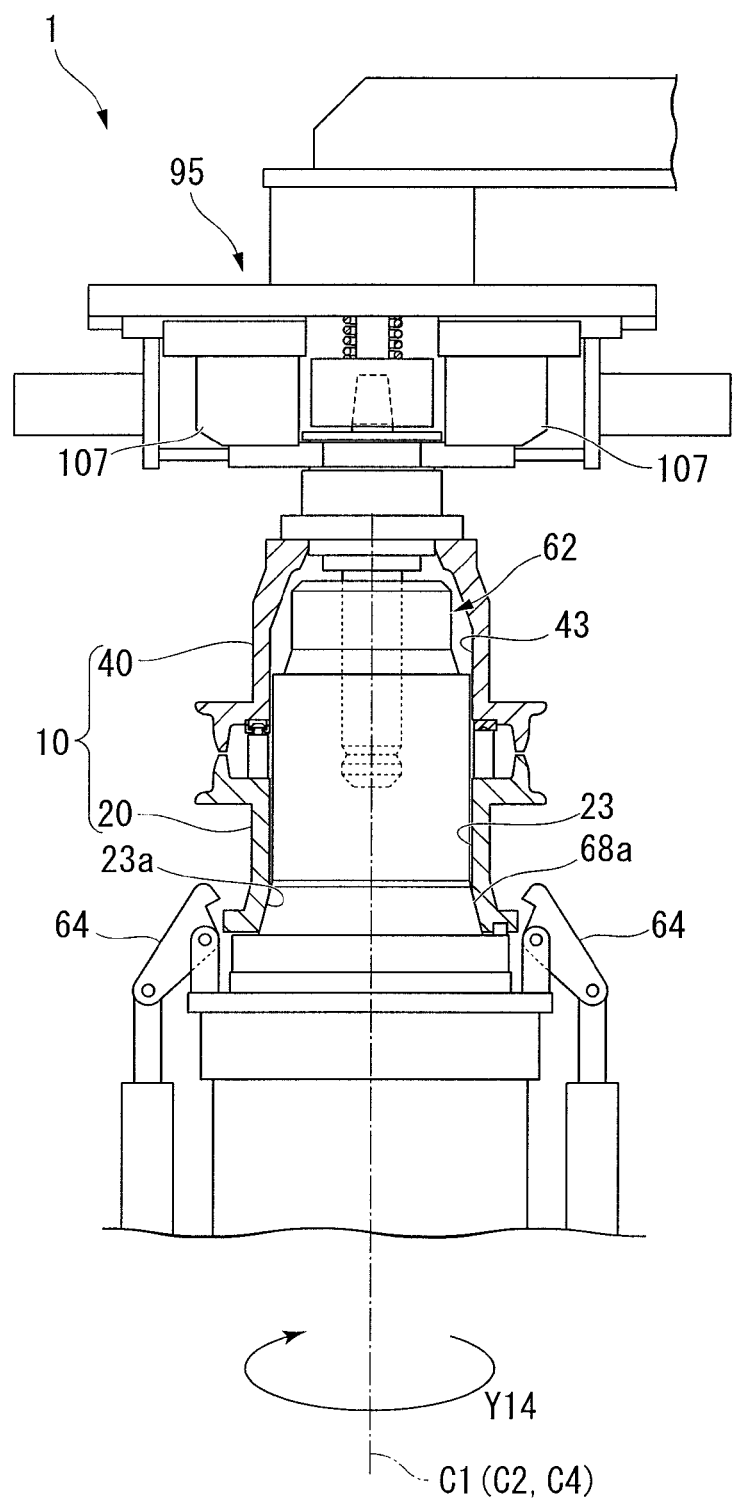
FIG. 27 is a view describing the operation of replacing the rim assembly in the tire uniformity measuring apparatus.

As shown in FIG. 27, the rim lifting and lowering device 95 is further lowered to cause the rim-side inclined surface 23a of the lower rim 20 to abut against the apparatus-side inclined surface 68a of the lower spindle 62, and the rim assembly 10 is supported by the apparatus-side inclined surface 68a.

At this time, since the lower spindle 62 is inserted into the lower through hole 23 and the upper through hole 43, respectively, both of the rims 20 and 40 is kept from tilting with respect to the axis C4 of the lower spindle 62.

As shown by arrow Y14, the lower spindle 62 is rotated in the clockwise direction around the axis C4 in a plan view, and the lower rim 20 is rotated with respect to the upper rim 40. At this time, the phase relationship between the upper rim 40 and the lower rim 20 is as shown in FIGS. 8 and 9. The projection portions 30 of the pins 27 reach the inserting opening portions 48 by the clockwise rotation of the lower rim 20. This can release the engagement between the pin receiving portions 46 and the pins 27. That is, by lifting the rim lifting and lowering device 95, the pins 27 can be set apart from the pin receiving portions 46, and as shown in FIG. 1, the rim assembly 10 can be separated into the lower rim 20 and the upper rim 40.

The case where the tire T is mounted on the rim assembly 10 to perform measurement will be described.

As shown in FIG. 17, the tire T is arranged on the collar portion 22 of the lower rim 20 from a state where the tire measuring apparatus 1 is as shown in FIG. 1.

The rim lifting and lowering device 95 is lowered to a predetermined rim breadth for tire measurement. At this time, the upper rim shaft 112 is inserted into the through hole 79a of the taper sleeve 77 of the engaging mechanism 76 and inserted between the pair of hooks 87.

If the hook operating rod 78 is moved upward, the internal diameter of the through hole 79a of the taper sleeve 77 becomes small, an upper portion of the upper rim shaft 112 is fixed to the lower spindle 62 via the taper sleeve 77, the engaging claws 87a of the hooks 87 engage the engaging concave portion 112a of the upper rim shaft 112. In this way, the upper rim shaft 112 is fixed to the lower spindle 62 by changing the engaging mechanism 76 from the standby state to the engagement state. As a result, the lower spindle 62, the rim assembly 10, and the connecting adapter 110 are integrated.

Next, by supplying air by the air supply source 73 to discharge air from the hole portion for a tire (not shown), the air within the tire T is caused to reach a predetermined pressure, and the tire T is caused to fit to both of the rims 20 and 40. At this time, by the pressure of the air, the tire T is pressed against and stuck fast to the collar portion 22 of the lower rim 20 or the collar 42 of the upper rim 40, and simultaneously, the lower rim 20 is also pressed against the apparatus-side inclined surface 68a.

If the lower spindle 62 is rotated by the servo motor 90, the tire T rotates around the axis C4 together with the rim assembly 10 and the connecting adapter 110. The load wheel 124 is brought close to the lower spindle 62 and brought into contact with the tire T, and the distribution of the load that acts on the tire T is measured.

Figure 28:
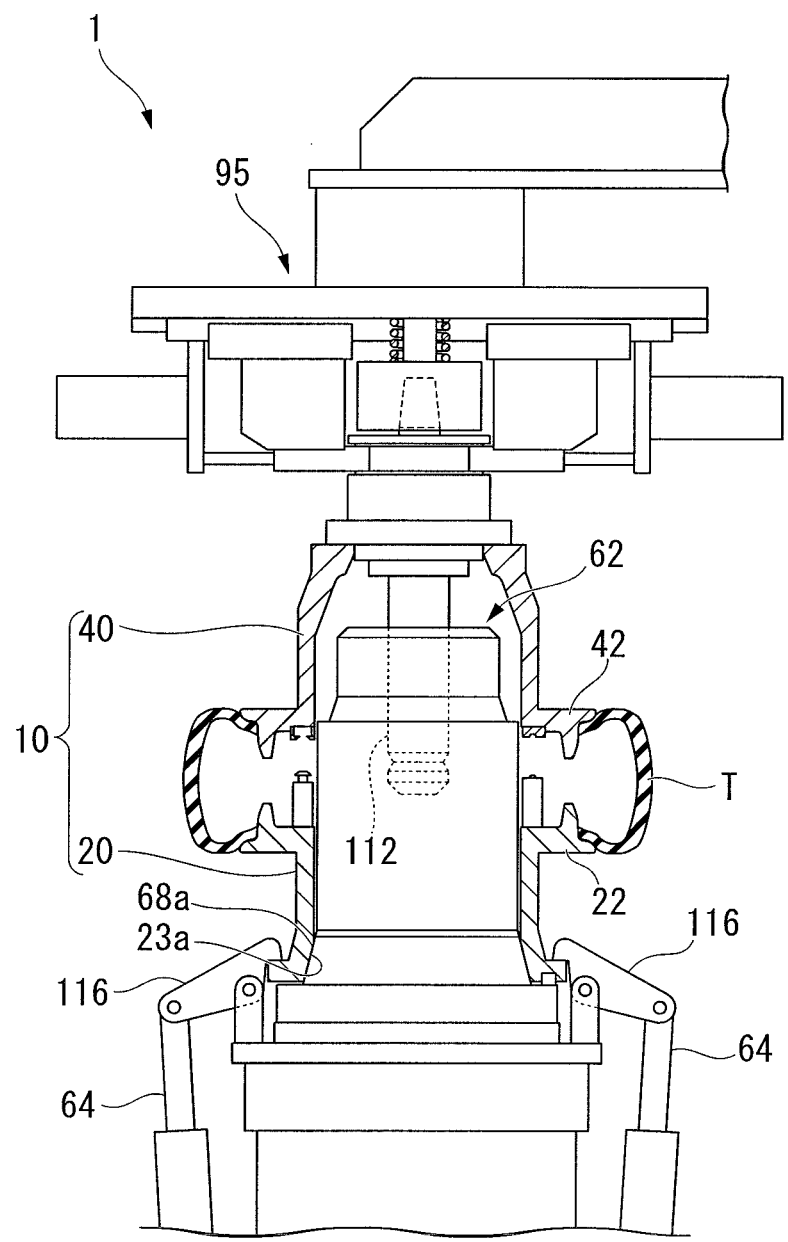
FIG. 28 is a view describing the operation of mounting a tire on the rim assembly to perform measurement.

The rotation of the lower spindle 62 is stopped after the measurement of the load distribution. As shown in FIG. 28, the fixing mechanisms 64 are brought into the fixing state, and the lower rim 20 is fixed onto the apparatus-side inclined surface 68a by the hooks 116. Since the lower rim 20 is fixed by the fixing mechanisms 64 if the upper rim 40 is lifted by the rim lifting and lowering device 95, the lower rim 20 does not move when the tire T is detached.

As described above, according to the tire measuring apparatus 1 of the present embodiment, the lower rim 20 and the upper rim 40, which are held in a mutually facing state and have the tire T attached thereto, are supported by inserting the lower spindle 62 through the lower through hole 23 of the lower rim 20 and causing the apparatus-side inclined surface 68a to abut against the rim-side inclined surface 23a. At this time, since the lower spindle 62 is inserted into the lower through hole 23, the inner peripheral surface of the lower through hole 23 contacts the lower spindle 62 when the lower rim 20 tilts with respect to the apparatus-side inclined surface 68a, so that the lower rim 20 can be kept from tilting and positionally deviating with respect to the apparatus-side inclined surface 68a.

Additionally, in the tire measuring apparatus 1, the tube part 67 is provided so as to stand in line with the upper side of the apparatus-side inclined surface 68a with a smaller external diameter. Thus, the external diameter of the tube part 67 can be suppressed to be small, and the tire testing apparatus 1 can be miniaturized.

In the tire measuring apparatus 1, if air is supplied to between both of the rims 20 and 40 by the air supply source 73 when the tire T is attached between both of the rims 20 and 40, a force to set both of the rims 20 and 40 apart from each other with the pressure of the air is exerted, and the rim-side inclined surface 23a is pressed against the apparatus-side inclined surface 68a. For this reason, a frictional force between the apparatus-side inclined surface 68a and the rim-side inclined surface 23a is increased, and the lower rim 20 can be reliably supported on the apparatus-side inclined surface 68a.

The lower spindle 62 is formed with the hole portion 72, and the opening 72a of the hole portion 72 is provided at a position that faces the inner peripheral surface of the lower rim 20 when the lower rim 20 is attached to the lower spindle 62. Air is supplied to the hole portion 72 by the air supply source 73 and the air is discharged from the opening 72a, in a state where the lower spindle 62 is inserted into the lower through hole 23 and the inner peripheral surface of the lower rim 20 is made to face the opening 72a of the hole portion 72. Since the discharged air flows between the lower spindle 62 and the inner peripheral surface of the lower through hole 23, dust or the like adhering to the outer peripheral surface of the lower spindle 62 can be blown away and removed with the air.

In the tire measuring apparatus 1, the small clearance E1 is formed between the outer peripheral surface 67a of the tube part 67 and the inner peripheral surface of the lower through hole 23 when the lower rim 20 is attached to the lower spindle 62. This can keep the lower rim 20 from tilting with respect to the apparatus-side inclined surface 68a with high precision.

The lower spindle 62 can be inserted not only into the lower through hole 23 of the rim assembly 10 but also into the upper through hole 43. For this reason, not only the lower rim 20 but also the upper rim 40 can be directly positioned by the lower spindle 62, and both of the rims 20 and 40 can be prevented from positionally deviating, respectively.

Additionally, as the small clearance is formed between the lower spindle 62 and the upper through hole 43, the upper rim 40 can be prevented from tilting with respect to the apparatus-side inclined surface 68a with high precision.

The tire measuring apparatus 1 includes the adapter body 111, the positioning part 96, and the chuck part 97. Since the connecting adapter 110 is engaged by the chuck part 97 positioned to keep a relative center, the connecting adapter is aligned in the direction of the axis C7 of the connecting adapter 110 and the direction parallel to the horizontal surface. Moreover, as the upper rim-side inclined surface 111a is biased downward by the positioning part 96, the connecting adapter 110 can be more reliably positioned in a direction parallel to the horizontal surface orthogonal to the axis C7.

The tire measuring apparatus 1 includes the base 61, and the fixing mechanisms 64 provided at the base 61. When the lower spindle 62 is in the state of being stopped with respect to the base 61, such as when the measurement of the tire T has ended, the lower rim 20 can be prevented from moving when the tire T is detached by fixing the lower rim 20 onto the apparatus-side inclined surface 68a with the fixing mechanisms 64 and moving the upper rim 40 so as to be set apart from the lower rim 20.

Additionally, since the fixing mechanisms 64 are provided at the base 61, compared to a case where the fixing mechanisms 64 are provided at the lower spindle 62 and rotated, it is unnecessary to rotate the fixing mechanisms 64 and the fixing mechanisms 64 can be simply configured.

Although one embodiment of the present invention has been described above in detail with reference to the drawings, specific configuration is not limited to this embodiment, and changes of the configuration are also included without departing from the scope of the invention.

Figure 29:
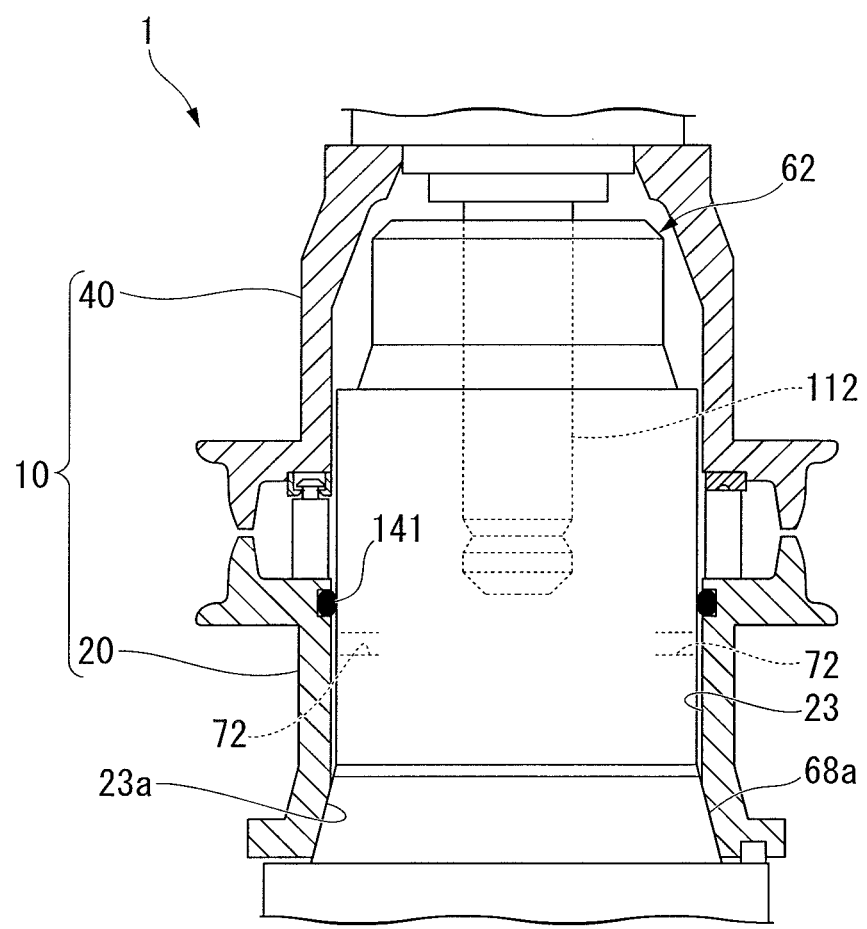
FIG. 29 is a cross-sectional view of main portions in a modified example of the tire uniformity measuring apparatus.

For example, in the aforementioned embodiment, as shown in FIG. 29, an elastic member 141, such as an O ring, which comes into sliding contact with the outer peripheral surface of the lower spindle 62, may be provided on the inner peripheral surface of the lower through hole 23 of the lower rim 20.

The elastic member 141 is provided above a position further apart from the rim-side inclined surface 23a than the opening 72a when the rim-side inclined surface 23a abuts against the apparatus-side inclined surface 68a and the lower rim 20 is attached to the lower spindle 62. By adopting such a configuration, the air discharged from the opening 72a flows toward the apparatus-side inclined surface 68a. Accordingly, dust adhering to the outer peripheral surface of the lower spindle 62 or the like can be effectively detached.

In the present embodiment, since the tire T can be easily detached from the lower rim 20 when the tire T is not easily stuck due to the material quality of the tire T even if the tire T is pressed against both of the rims 20 and 40, the fixing mechanisms 64 may not be included.

In the present embodiment, in order to supply air to the hole portion 72, a dedicated supply part that is different from the air supply source 73 may be included.

In the aforementioned embodiment, the tire testing apparatus is the tire uniformity measuring apparatus. However, the tire testing apparatus is not limited to this, and may be a tire balance measuring apparatus and the like.

INDUSTRIAL APPLICABILITY

The present invention relates to a tire testing apparatus for attaching a tire to perform testing. According to the invention, the lower rim can be kept from positionally deviating with respect to the apparatus-side inclined surface.

REFERENCE SIGNS LIST

1: TIRE MEASURING APPARATUS (TIRE TESTING APPARATUS)
20: LOWER RIM
23: LOWER THROUGH HOLE
23a: RIM-SIDE INCLINED SURFACE
40: UPPER RIM
43: UPPER THROUGH HOLE
61: BASE (SUPPORTING PART)
64: FIXING MECHANISM
67: TUBE PART (INSERTION PART)
68a: APPARATUS-SIDE INCLINED SURFACE
72: HOLE PORTION
73: AIR SUPPLY SOURCE (PNEUMATIC SUPPLY PART)
96: POSITIONING PART
97: CHUCK PART (CLAMPING PART)
111: ADAPTER BODY (CONNECTING PART)
141: ELASTIC MEMBER
C4: AXIS
E1: SMALL CLEARANCE
T: TIRE

The invention claimed is:

1. A tire testing apparatus comprising:
a lower rim that is formed with a lower through hole, and a rim-side inclined surface that increases in diameter in a downward direction of an inner peripheral surface of a lower end portion of the lower through hole;
an upper rim that is held to face the lower rim;
an insertion part capable of being inserted into the lower through hole; and
an apparatus-side inclined surface that is provided at a lower end portion of the insertion part, increases in diameter from an outer peripheral surface of the insertion part in the downward direction, and is capable of coming into contact with the rim-side inclined surface,
wherein the tire testing apparatus is configured to attach a tire between the lower rim and the upper rim to perform testing of the tire, and
wherein a small clearance is formed between the insertion part and the lower through hole when the rim-side inclined surface abuts against the apparatus-side inclined surface.

2. The tire testing apparatus according to claim 1, further comprising:
a pneumatic supply part configured to supply gas to between the lower rim and the upper rim when the rim-side inclined surface abuts against the apparatus-side inclined surface.

3. The tire testing apparatus according to claim 2, wherein a hole portion that opens so as to be capable of discharging the gas supplied from the pneumatic supply part is formed at a position of the outer peripheral surface of the insertion part that faces the inner peripheral surface of the lower through hole when the rim-side inclined surface abuts against the apparatus-side inclined surface.

4. The tire testing apparatus according to claim 3, further comprising:
an elastic member that comes into sliding contact with the outer peripheral surface of the insertion part is provided at a position of the inner peripheral surfaces of the lower through hole that is further apart from the rim-side inclined surface than the hole portion when the rim-side inclined surface abuts against the apparatus-side inclined surface.

5. The tire testing apparatus according to claim 4, further comprising:
a supporting part configured to rotatably support the apparatus-side inclined surface around the axis of the insertion part; and
a fixing mechanism that is provided at the supporting part and is capable of switching a fixing state where the lower rim is fixed onto the apparatus-side inclined surface and a release state where the fixing state is released, when the rim-side inclined surface abuts against the apparatus-side inclined surface.

6. The tire testing apparatus according to claim 2, further comprising:
a supporting part configured to rotatably support the apparatus-side inclined surface around the axis of the insertion part; and
a fixing mechanism that is provided at the supporting part and is capable of switching a fixing state where the lower rim is fixed onto the apparatus-side inclined surface and a release state where the fixing state is released, when the rim-side inclined surface abuts against the apparatus-side inclined surface.

7. The tire testing apparatus according to claim 3, further comprising:
a supporting part configured to rotatably support the apparatus-side inclined surface around the axis of the insertion part; and
a fixing mechanism that is provided at the supporting part and is capable of switching a fixing state where the lower rim is fixed onto the apparatus-side inclined surface and a release state where the fixing state is released, when the rim-side inclined surface abuts against the apparatus-side inclined surface.

8. The tire testing apparatus according to claim 1, further comprising:
a connecting part that is detachably attached to the upper rim;
a clamping part configured to regulate movement of the connecting part in a direction of an axis of the connecting part; and
a positioning part that positions the connecting part regulated in movement by the clamping part in a direction orthogonal to the axis.

9. The tire testing apparatus according to claim 8, further comprising:
a supporting part configured to rotatably support the apparatus-side inclined surface around the axis of the insertion part; and
a fixing mechanism that is provided at the supporting part and is capable of switching a fixing state where the lower rim is fixed onto the apparatus-side inclined surface and a release state where the fixing state is released, when the rim-side inclined surface abuts against the apparatus-side inclined surface.

10. The tire testing apparatus according to claim 1, further comprising:
a supporting part configured to rotatably support the apparatus-side inclined surface around the axis of the insertion part; and
a fixing mechanism that is provided at the supporting part and is capable of switching a fixing state where the lower rim is fixed onto the apparatus-side inclined surface and a release state where the fixing state is released, when the rim-side inclined surface abuts against the apparatus-side inclined surface.

11. A tire testing apparatus comprising:
a lower rim that is formed with a lower through hole, and a rim-side inclined surface that increases in diameter in a downward direction of an inner peripheral surface of a lower end portion of the lower through hole;
an upper rim that is held to face the lower rim;
an insertion part capable of being inserted into the lower through hole; and
an apparatus-side inclined surface that is provided at a lower end portion of the insertion part, increases in diameter from an outer peripheral surface of the insertion part in the downward direction, and is capable of coming into contact with the rim-side inclined surface,
wherein the tire testing apparatus is configured to attach a tire between the lower rim and the upper rim to perform testing of the tire,
wherein the insertion part is capable of being inserted through an upper through hole with which the upper rim is formed and that is capable of communicating with the lower through hole when the lower rim and the upper rim are made to face each other, and
wherein a small clearance is formed between the insertion part and the upper through hole when the rim-side inclined surface abuts against the apparatus-side inclined surface.

12. The tire testing apparatus according to claim 11, further comprising:
a pneumatic supply part configured to supply gas to between the lower rim and the upper rim when the rim-side inclined surface abuts against the apparatus-side inclined surface.

13. The tire testing apparatus according to claim 12, wherein a hole portion that opens so as to be capable of discharging the gas supplied from the pneumatic supply part is formed at a position of the outer peripheral surface of the insertion part that faces the inner peripheral surface of the lower through hole when the rim-side inclined surface abuts against the apparatus-side inclined surface.

14. The tire testing apparatus according to claim 13, further comprising:
an elastic member that comes into sliding contact with the outer peripheral surface of the insertion part is provided at a position of the inner peripheral surfaces of the lower through hole that is further apart from the rim-side inclined surface than the hole portion when the rim-side inclined surface abuts against the apparatus-side inclined surface.

15. The tire testing apparatus according to claim 14, further comprising:
a supporting part configured to rotatably support the apparatus-side inclined surface around the axis of the insertion part; and
a fixing mechanism that is provided at the supporting part and is capable of switching a fixing state where the lower rim is fixed onto the apparatus-side inclined surface and a release state where the fixing state is released, when the rim-side inclined surface abuts against the apparatus-side inclined surface.

16. The tire testing apparatus according to claim 12, further comprising:
a supporting part configured to rotatably support the apparatus-side inclined surface around the axis of the insertion part; and
a fixing mechanism that is provided at the supporting part and is capable of switching a fixing state where the lower rim is fixed onto the apparatus-side inclined surface and a release state where the fixing state is released, when the rim-side inclined surface abuts against the apparatus-side inclined surface.

17. The tire testing apparatus according to claim 13, further comprising:
a supporting part configured to rotatably support the apparatus-side inclined surface around the axis of the insertion part; and
a fixing mechanism that is provided at the supporting part and is capable of switching a fixing state where the lower rim is fixed onto the apparatus-side inclined surface and a release state where the fixing state is released, when the rim-side inclined surface abuts against the apparatus-side inclined surface.

18. The tire testing apparatus according to claim 11, further comprising:
a connecting part that is detachably attached to the upper rim;
a clamping part configured to regulate movement of the connecting part in a direction of an axis of the connecting part; and
a positioning part that positions the connecting part regulated in movement by the clamping part in a direction orthogonal to the axis.

19. The tire testing apparatus according to claim 18, further comprising:
a supporting part configured to rotatably support the apparatus-side inclined surface around the axis of the insertion part; and
a fixing mechanism that is provided at the supporting part and is capable of switching a fixing state where the lower rim is fixed onto the apparatus-side inclined surface and a release state where the fixing state is released, when the rim-side inclined surface abuts against the apparatus-side inclined surface.

20. The tire testing apparatus according to claim 11, further comprising:
a supporting part configured to rotatably support the apparatus-side inclined surface around the axis of the insertion part; and
a fixing mechanism that is provided at the supporting part and is capable of switching a fixing state where the lower rim is fixed onto the apparatus-side inclined surface and a release state where the fixing state is released, when the rim-side inclined surface abuts against the apparatus-side inclined surface.

* * * * *